US010151499B2

(12) United States Patent
Lee et al.

(10) Patent No.: US 10,151,499 B2
(45) Date of Patent: Dec. 11, 2018

(54) APPARATUS FOR BOTH HUMIDIFICATION AND AIR CLEANING

(71) Applicant: LG Electronics Inc., Seoul (KR)

(72) Inventors: Kunyoung Lee, Seoul (KR); Taeyoon Kim, Seoul (KR); Jongsu Lee, Seoul (KR); Jieun Choi, Seoul (KR); Sanghyuk Son, Seoul (KR); Kyoungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 15/338,160

(22) Filed: Oct. 28, 2016

(65) Prior Publication Data

US 2017/0122596 A1    May 4, 2017

Related U.S. Application Data

(60) Provisional application No. 62/248,463, filed on Oct. 30, 2015.

(30) Foreign Application Priority Data

Nov. 7, 2015  (KR) .......................... 10-2015-0156254
Dec. 24, 2015 (KR) .......................... 10-2015-0186153

(51) Int. Cl.
| F24F 6/00  | (2006.01) |
| B01F 3/04  | (2006.01) |
| F24F 6/04  | (2006.01) |
| F24F 11/30 | (2018.01) |
| F24F 6/12  | (2006.01) |
| F24F 6/16  | (2006.01) |

(Continued)

(52) U.S. Cl.
CPC ................ F24F 6/04 (2013.01); B01D 46/10 (2013.01); B01F 3/04 (2013.01); B01F 3/04099 (2013.01); F24F 3/1603 (2013.01); F24F 6/00 (2013.01); F24F 6/12 (2013.01); F24F 6/16 (2013.01); F24F 11/30 (2018.01); F24F 13/20 (2013.01); F24F 13/28 (2013.01); B01D 2279/50 (2013.01); F24F 2006/008 (2013.01); F24F 2006/046 (2013.01); F24F 2006/146 (2013.01)

(58) Field of Classification Search
CPC ....... F24F 6/00; F24F 6/12; B01F 3/04; B01F 3/04099
USPC ............................... 261/72.1, 78.2
See application file for complete search history.

(56) References Cited

U.S. PATENT DOCUMENTS 1,994,912 A * 3/1935 Hochstetter ......... B01F 3/04035
                                                    261/91
2006/0163754 A1   7/2006 Barthelson et al.

FOREIGN PATENT DOCUMENTS

CN  201348328 Y  11/2009
EP  2 860 464 A1  4/2015
(Continued)

*Primary Examiner* — Robert A Hopkins
(74) *Attorney, Agent, or Firm* — Dentons US LLP

(57) ABSTRACT

Provided is a humidification and air cleaning apparatus. The humidification and air cleaning apparatus includes: a water tank storing water; a visual body coupled to the water tank, disposed over the water tank, and formed of a transparent material; a display module disposed outside the visual body; and a watering housing disposed in the water tank and having a nozzle to spray water. Here, water drops, formed on an inner side surface of the visual body, and the display module are disposed on an eye line of a user.

13 Claims, 22 Drawing Sheets

(51) Int. Cl.
*B01D 46/10* (2006.01)
*F24F 3/16* (2006.01)
*F24F 13/20* (2006.01)
*F24F 13/28* (2006.01)
*F24F 6/14* (2006.01)

(56) References Cited

FOREIGN PATENT DOCUMENTS

| | | |
|---|---|---|
| JP | 2007-237068 A | 9/2007 |
| JP | 2007-326065 A | 12/2007 |
| JP | 3190694 U | 5/2014 |
| KR | 10-2015-0047254 A | 5/2015 |

* cited by examiner

230

APPARATUS FOR BOTH HUMIDIFICATION AND AIR CLEANING

CROSS-REFERENCE TO RELATED APPLICATIONS

This application claims the benefit of U.S. Provisional Patent Application No. US 62/248,463, filed on Oct. 30, 2015, Korean Patent Application No. 10-2015-0156254 filed on Nov. 7, 2015, and Korean Patent Application No. 10-2015-0186153 filed on Dec. 24, 2015 which are incorporated herein by reference for all purposes as if fully set forth herein.

BACKGROUND OF THE INVENTION

The present invention disclosed herein relates to an apparatus for both humidification and air cleaning.

Air conditioning apparatuses include air conditioners that control the temperature of air, air cleaners that remove foreign substances from air to maintain air cleanliness, humidifiers that increase humidity in the air, and dehumidifiers that reduce humidity in the air.

Typical humidifiers are classified into a vibration type which atomizes water on a vibrating plate and discharges atomized water into air and a natural evaporation type that naturally evaporates water in a humidification filter.

The natural evaporation type of humidifier is classified into a disc type of humidifier which rotates a disc using a driving force and allows water to naturally evaporate from the surface of the disc in the air and a humidification filter type of humidifier which allows water to naturally evaporate from a wet humidification medium by flowing air.

In a typical humidifier, a portion of flowing air during the humidification process is filtered by a filter. However, since the main function of a typical humidifier is a humidification function, its air cleaning function is weak.

Also, since a typical humidifier has a structure in which the humidification process is performed by adding a filtration function, a typical humidifier cannot be operated only for air filtration.

Accordingly, even in a situation where humidity is high, a typical humidifier inevitably performs humidification even though a user desires air cleaning.

SUMMARY OF THE INVENTION

The present invention provides a humidification and air cleaning apparatus which can separately operate a humidification function and an air cleaning function.

The present invention also provides a humidification and air cleaning apparatus which can allow a user to intuitively check with his/her eyes whether humidification is performed.

The present invention also provides a humidification and air cleaning apparatus which can prevent a display module from contacting water.

The present invention also provides a humidification and air cleaning apparatus which includes a display module and a visual body disposed on a user's eye line.

The present invention also provides a humidification and air cleaning apparatus which can maximize a visual effect of water drops formed on a visual body.

The present invention also provides a humidification and air cleaning apparatus which can prevent a support guide and a water tank inlet, guiding air into a water tank, from being exposed to the outside.

The present invention also provides a humidification and air cleaning apparatus which can allow a user to observe water sprayed from a watering housing.

Embodiments of the present invention provide humidification and air cleaning apparatuses including: a water tank storing water; a visual body coupled to the water tank, disposed over the water tank, and formed of a transparent material; a display module disposed outside the visual body; a watering housing disposed in the water tank, drawing water stored in the water tank to pump water to an upper side, and spraying the pumped water; a nozzle disposed in the watering housing and spraying the pumped water; and a watering motor rotating the watering housing, wherein water drops formed on an inner side surface of the visual body and the display module are disposed on an eye line of a user.

In some embodiments, the watering housing may be disposed on the eye line of a user, and water sprayed from the nozzle may collide with an inner side surface of the visual body.

In some embodiments, the visual body may have an upper side thereof wider than a lower side thereof while having a side surface thereof oblique, and may be disposed over the display module.

In some embodiments, the display module may have a surface thereof coated with a material reflecting light, and water drops formed on the inner side surface of the visual body may be projected on the surface of the display module.

In some embodiments, the visual body may have a section thereof circular when viewed from top, and the display module may have a ring shape covering the visual body.

In some embodiments, water sprayed from the nozzle of the watering housing may be viewed on the eye line of a user.

In some embodiments, the nozzle of the watering housing may be disposed within a height of the visual body.

In some embodiments, the humidification and air cleaning apparatus may further include a base body on which the water tank is separably placed, wherein the display module is coupled to the base body, and the water tank is separated from the display module when the water tank is separated from the base body.

In some embodiments, the display module may be formed into a ring shape, and the water tank may be inserted into the inside of the display module to be placed on the base body.

In some embodiments, when the water tank is placed, the display module may be disposed to seal an outer surface of the water tank.

In some embodiments, the humidification and air cleaning apparatus may further include an outer visual body coupled to the base body and formed of a transparent material, wherein the display module is disposed between the outer visual body and the visual body.

In some embodiments, when the water tank is placed on the base body, an upper end of the visual body adheres closely to an upper end of the outer visual body, and a sealed visual space is formed among the visual body, the outer visual body, and the display module.

In some embodiments, the humidification and air cleaning apparatus may further include a water tank inlet disposed between the water tank and the visual body, wherein air supplied from the base body flows into the water tank through the water tank inlet, and the display module is disposed higher than the water tank inlet.

In some embodiments, the base body may include: a lower body including an intake flow passage formed at a lower side thereof; a support body coupled to an upper side of the lower body and placed on the water tank; and a water tank insertion space formed in the support body and accommodating the water tank, wherein the display module is disposed on the upper end of the support body.

In some embodiments, the humidification and air cleaning apparatus may further include a water tank inlet disposed between the water tank and the visual body, wherein air supplied from the base body flows into the water tank through the water tank inlet, and the display module is disposed higher than the water tank inlet, and the support body includes a support guide that guides air supplied through the intake flow passage to the water tank inlet.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
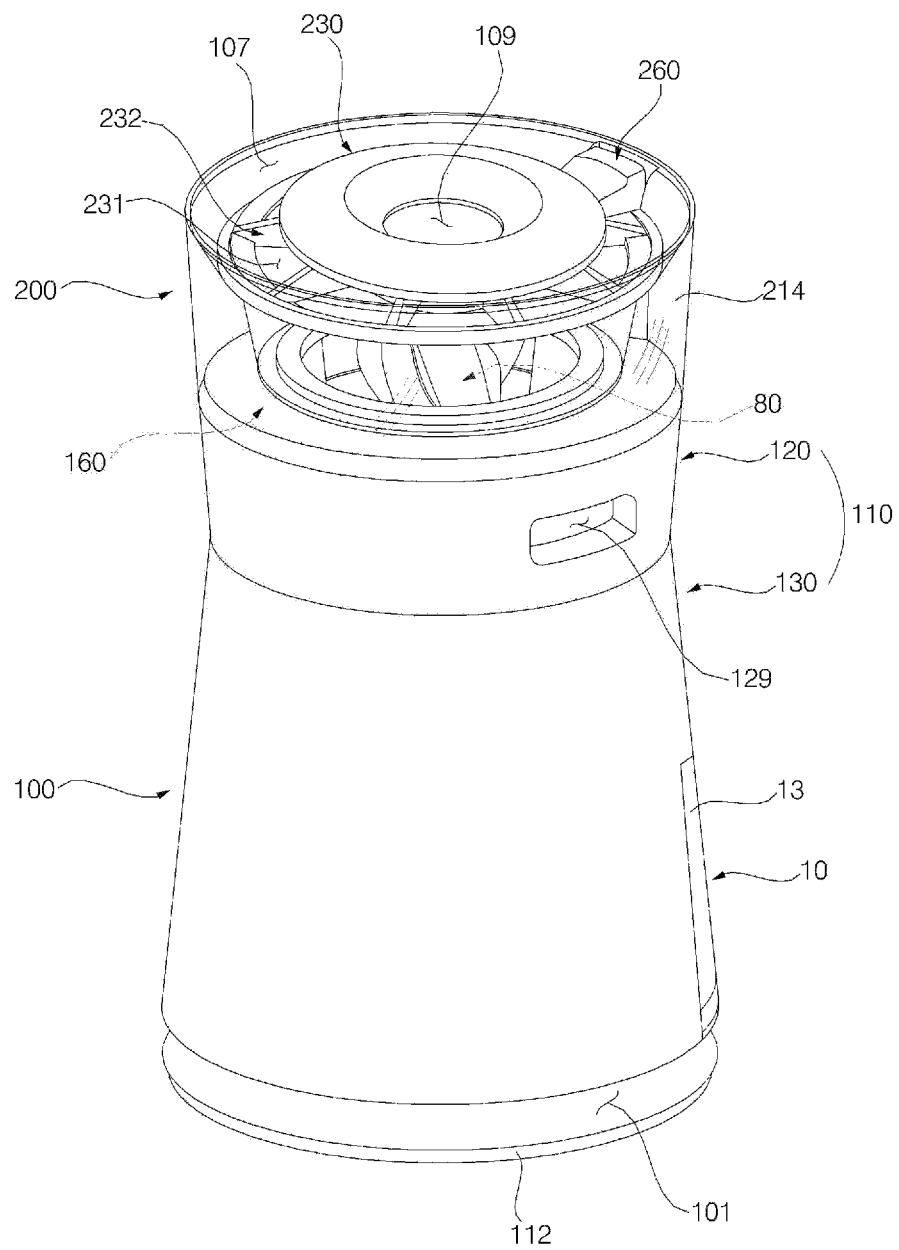
FIG. 1 is a perspective view illustrating a humidification and air cleaning apparatus according to a first embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Figure 2:
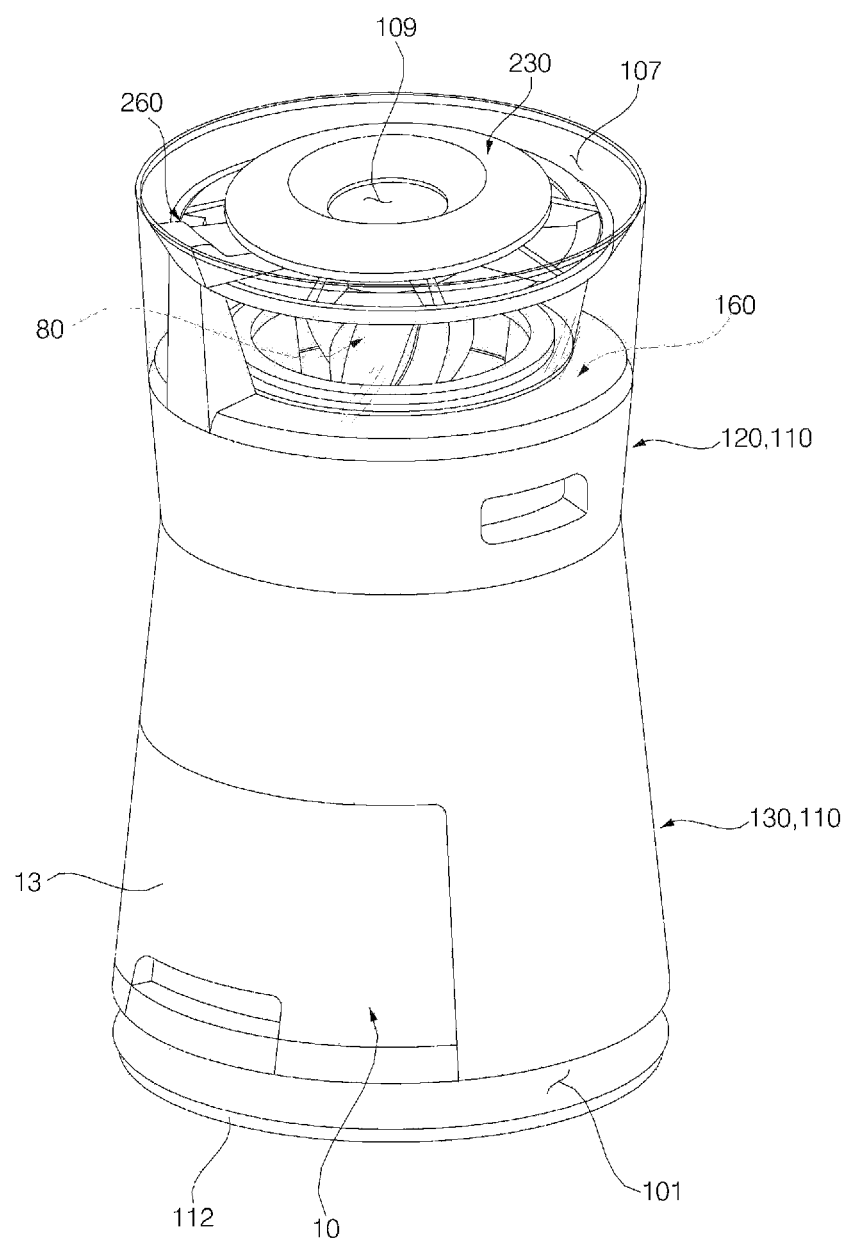
FIG. 2 is a rear perspective view of FIG. 1.
Figure 3:
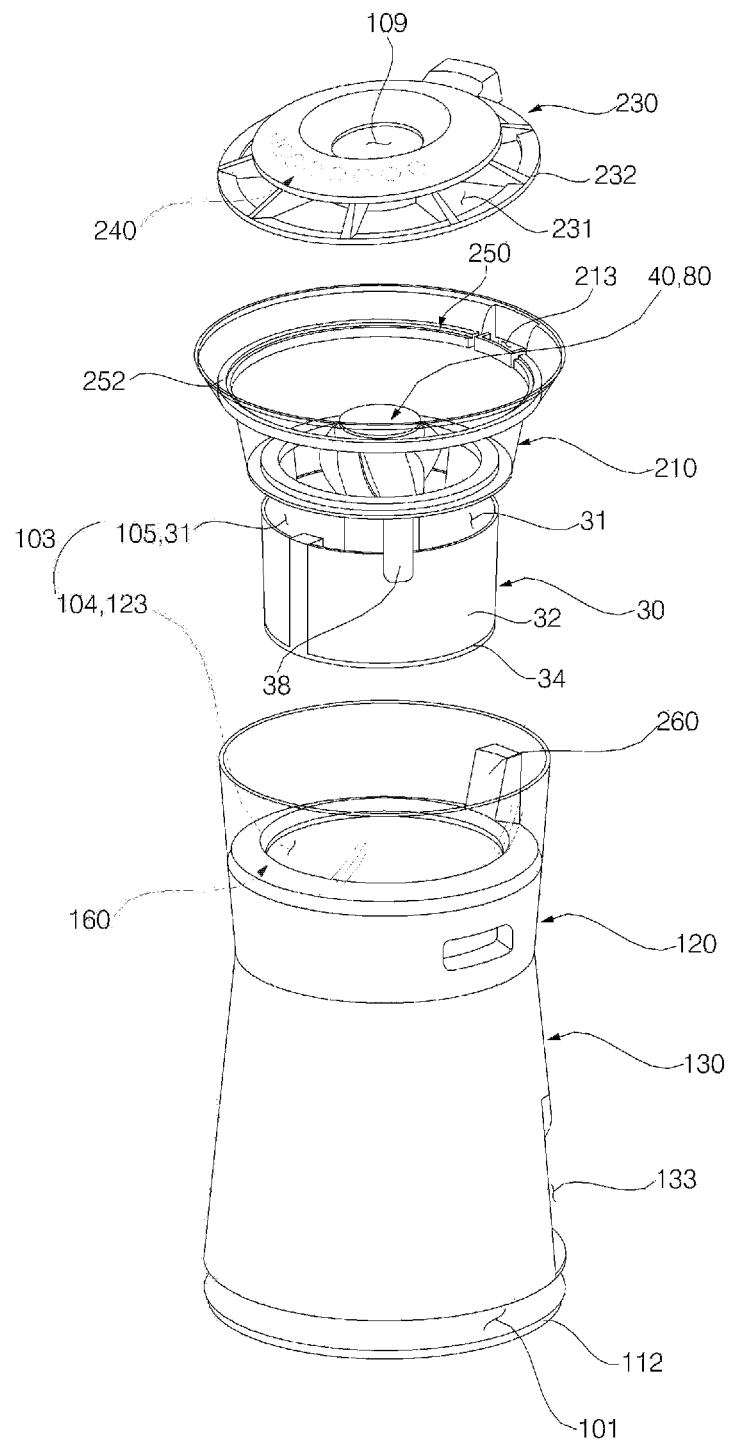
FIG. 3 is an exploded perspective view of FIG. 1.
Figure 4:
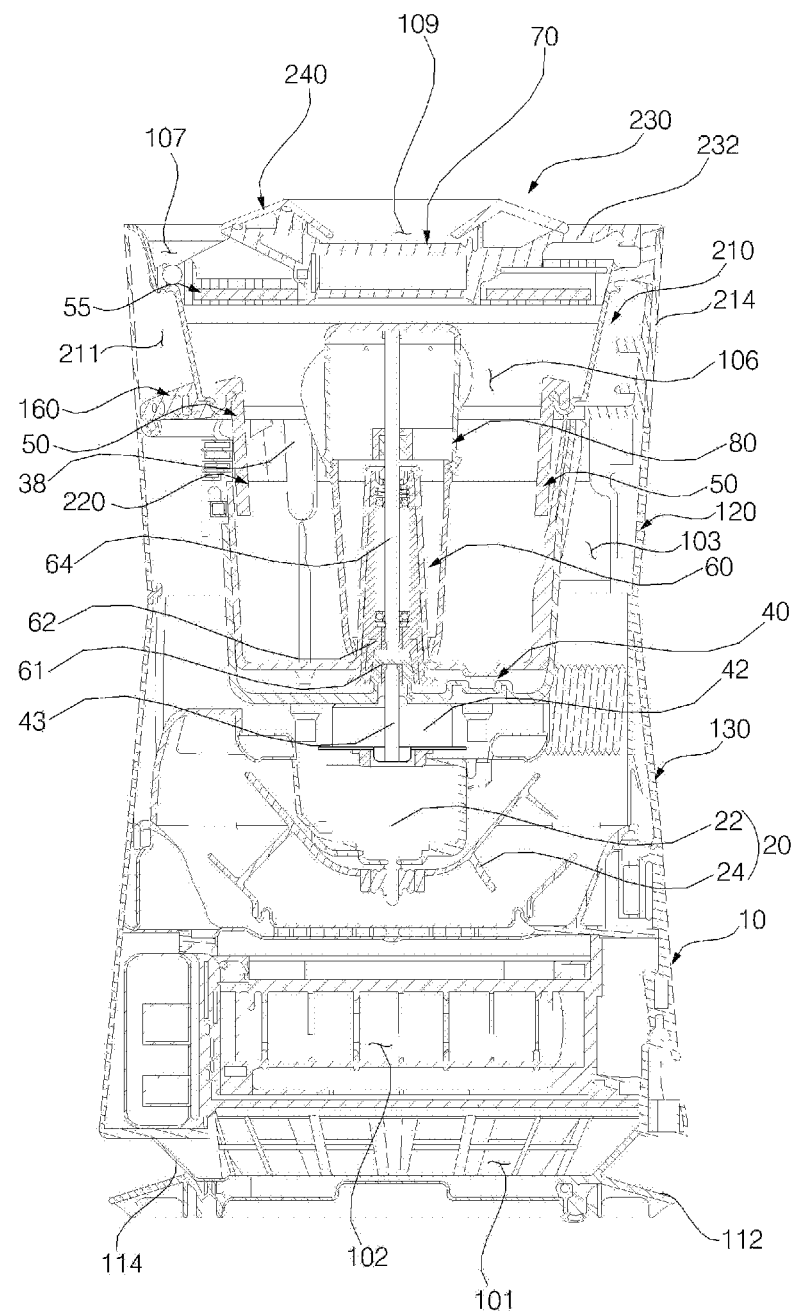
FIG. 4 is a cross-sectional view of FIG. 1.
Figure 5:
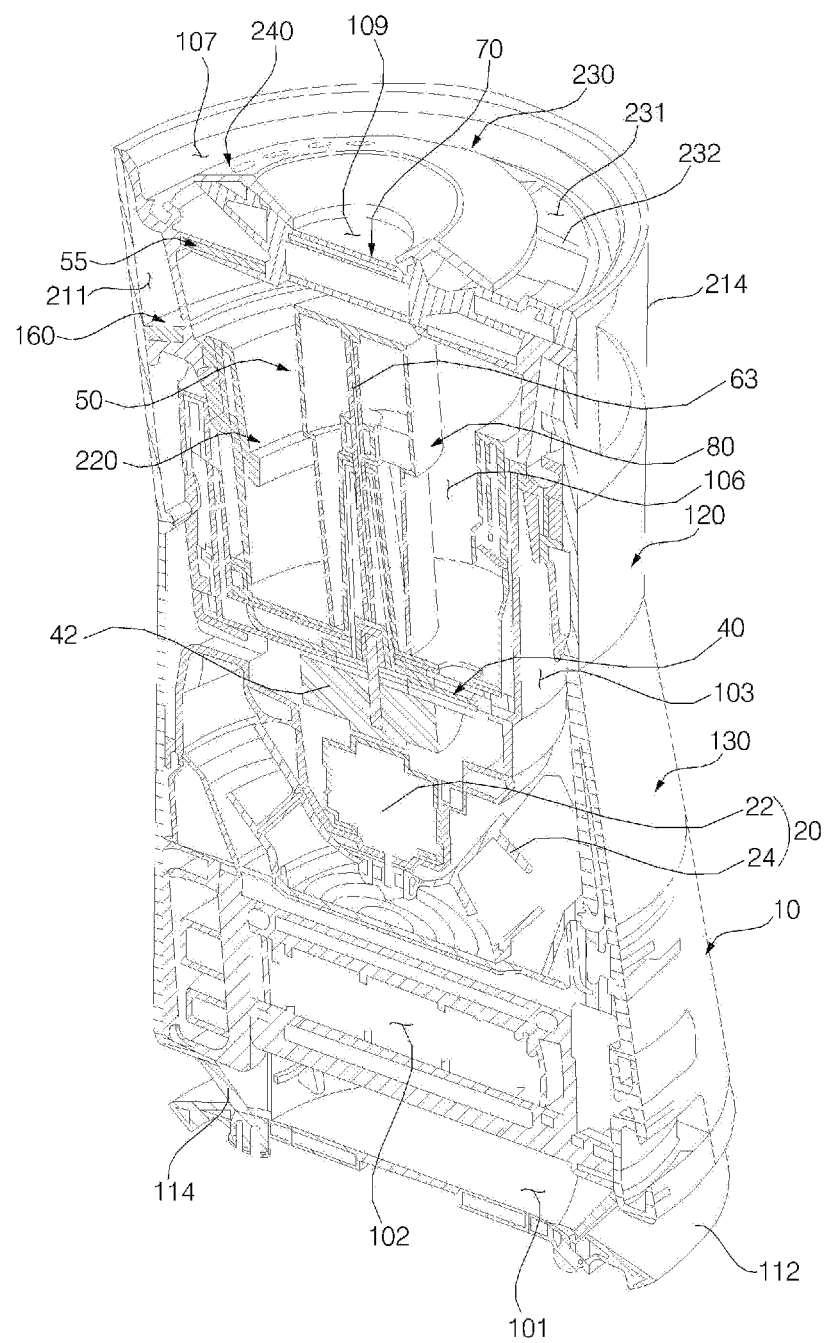
FIG. 5 is a cross-sectional perspective view of FIG. 1.
Figure 6:
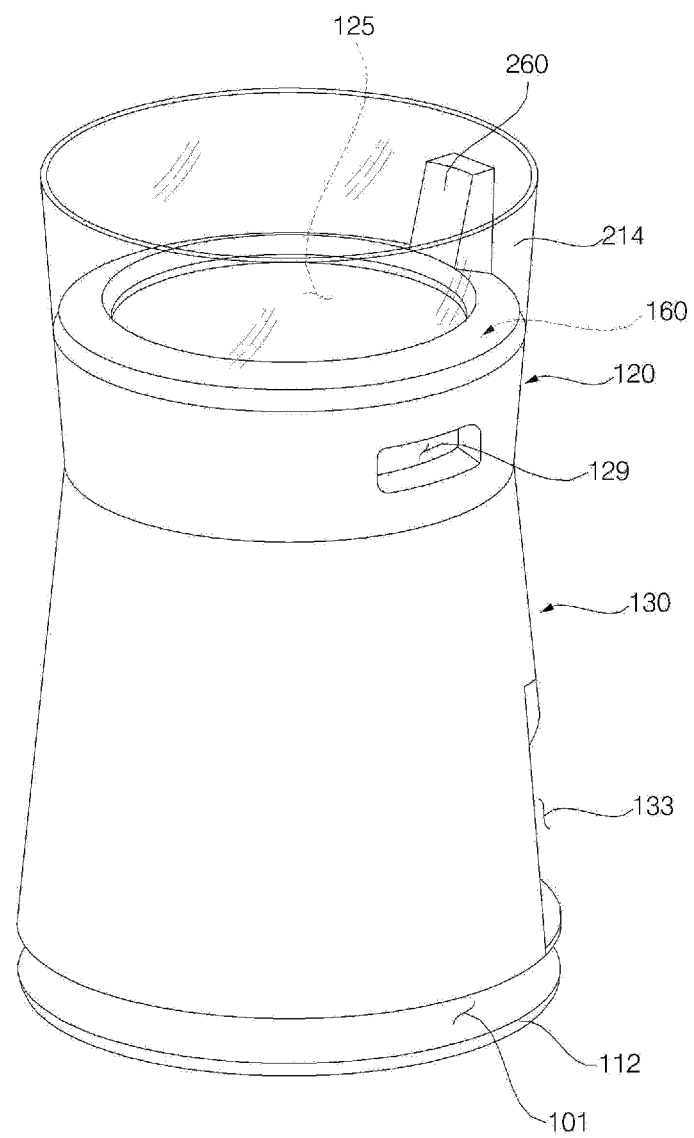
FIG. 6 is a perspective view of a clean module shown in FIG. 3.
Figure 7:
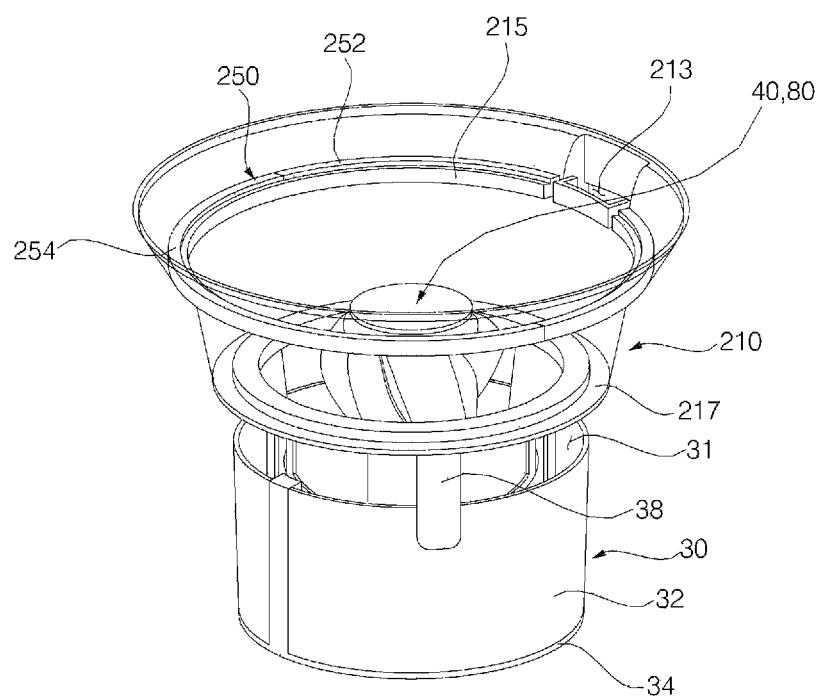
FIG. 7 is a perspective view of a humidification module shown in FIG. 3.
Figure 8:
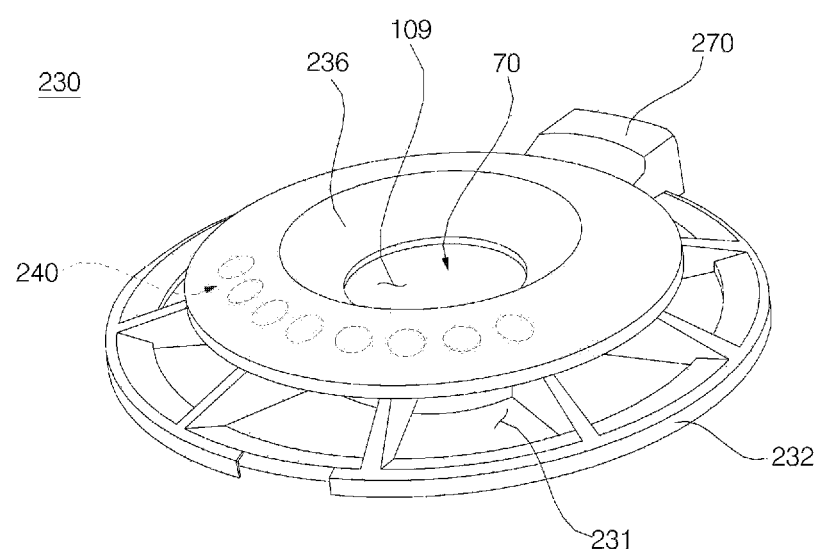
FIG. 8 is a side view illustrating a top cover assembly shown in FIG. 3.
Figure 9:
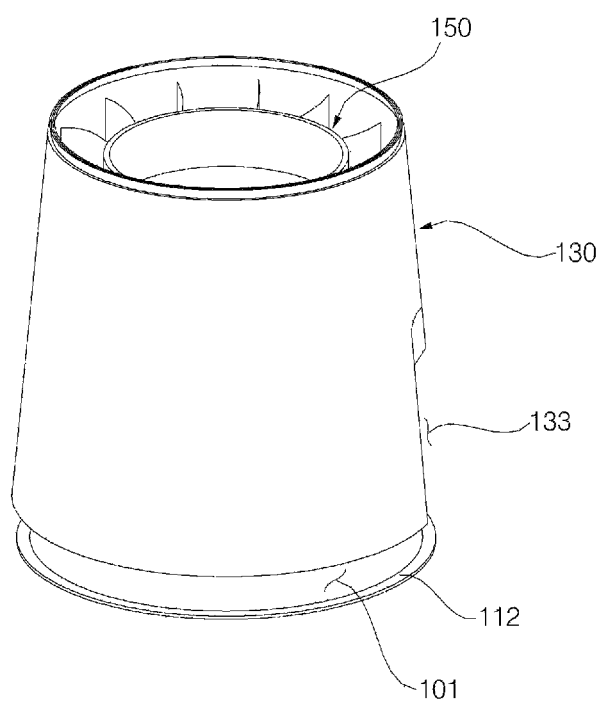
FIG. 9 is a perspective view illustrating a lower body without a support body in FIG. 6.
Figure 10:
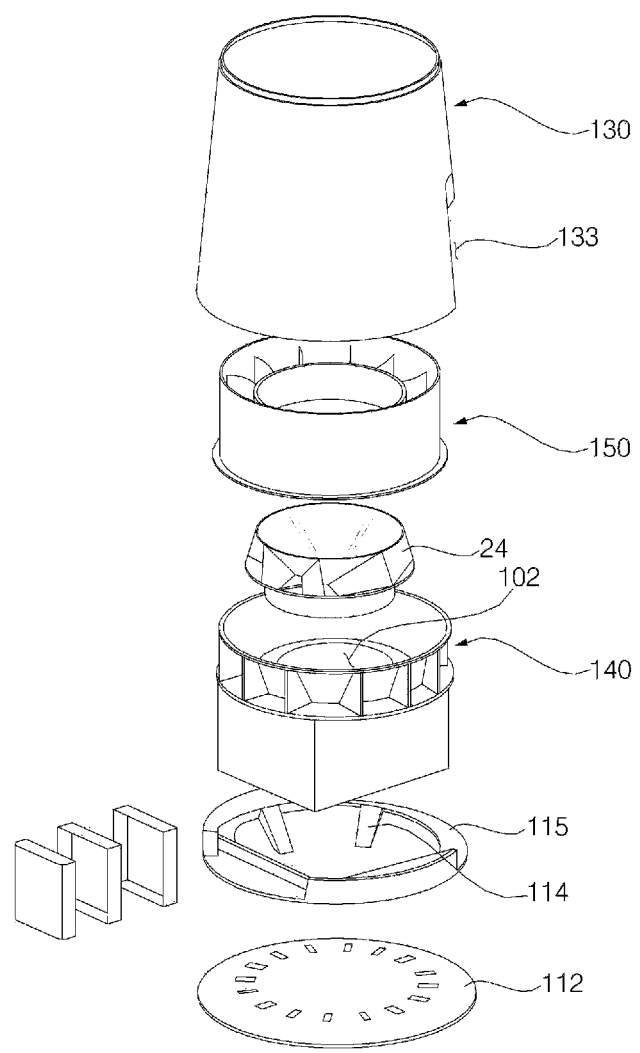
FIG. 10 is an exploded perspective view of FIG. 9.
Figure 11:
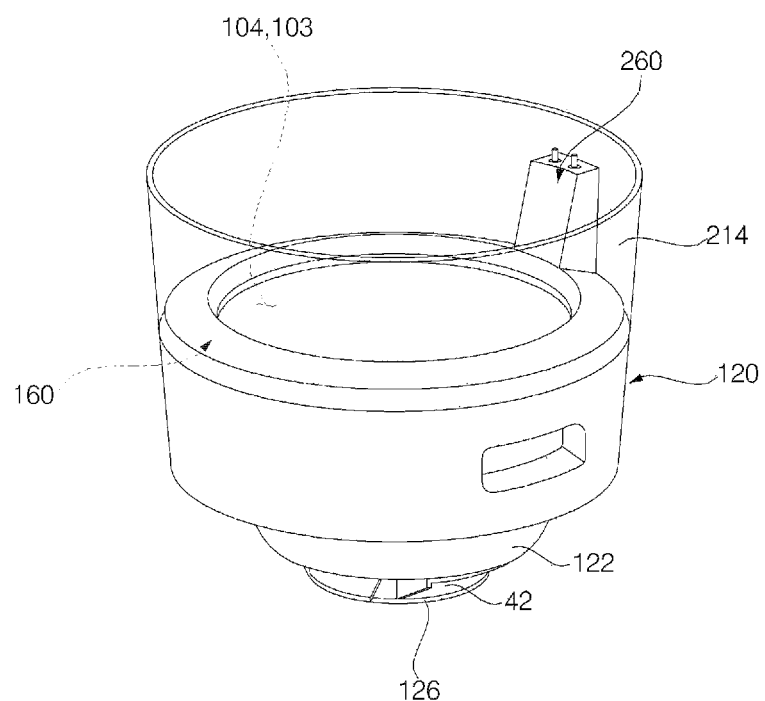
FIG. 11 is a perspective view illustrating a support body in FIG. 6.
Figure 12:
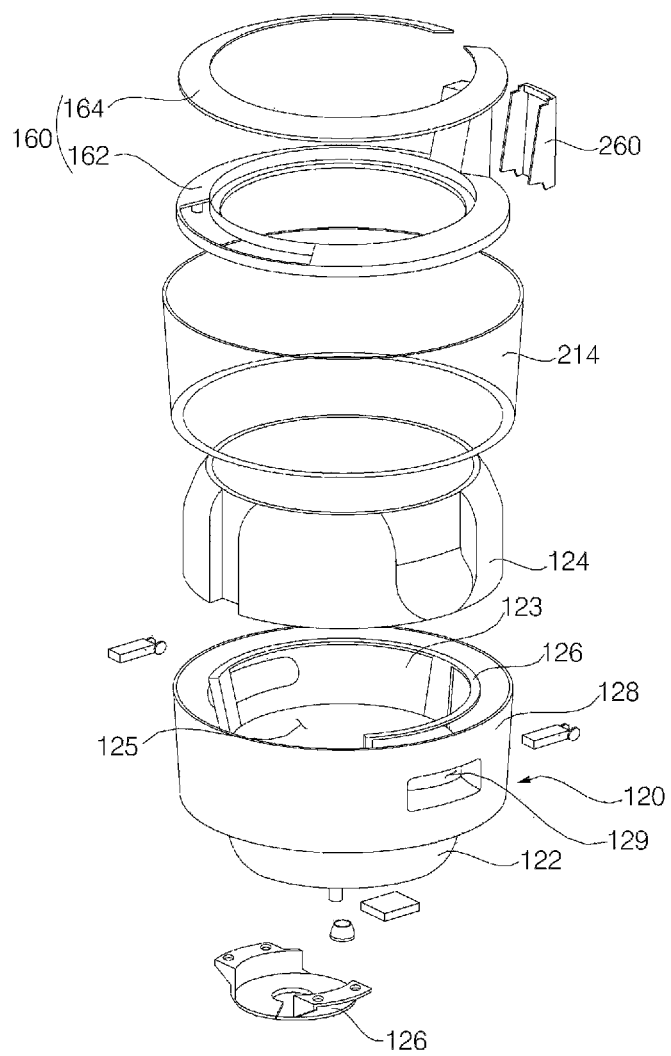
FIG. 12 is an exploded perspective view of FIG. 11.
Figure 13:
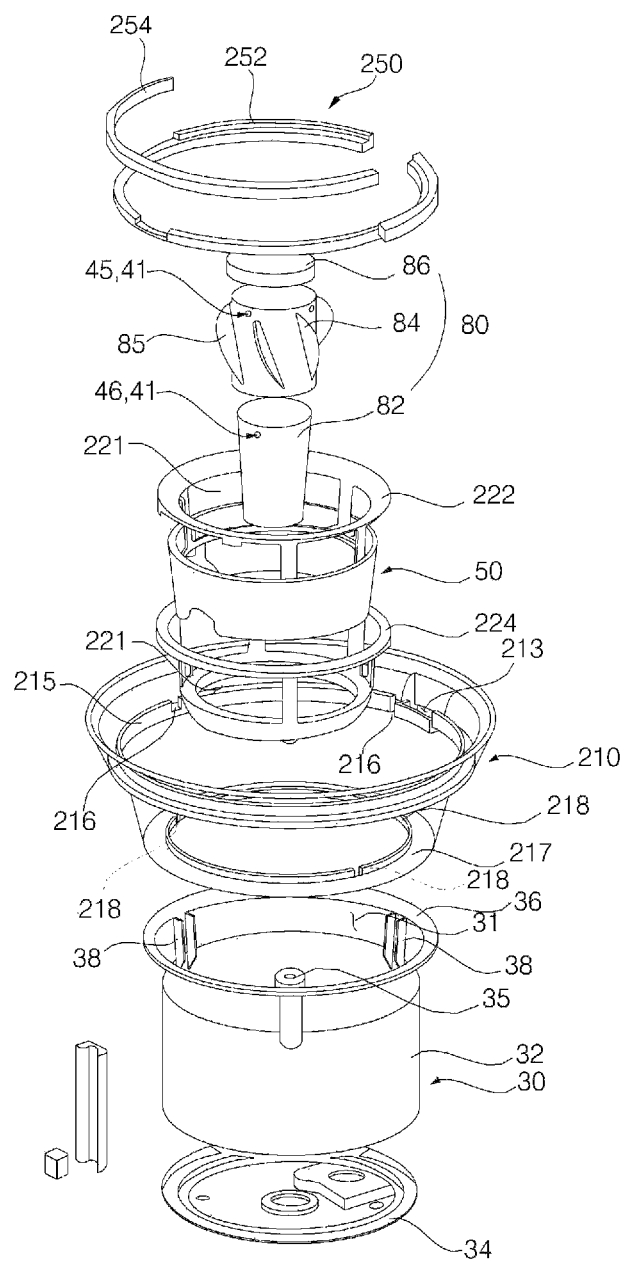
FIG. 13 is an exploded perspective view of FIG. 6.
Figure 14:
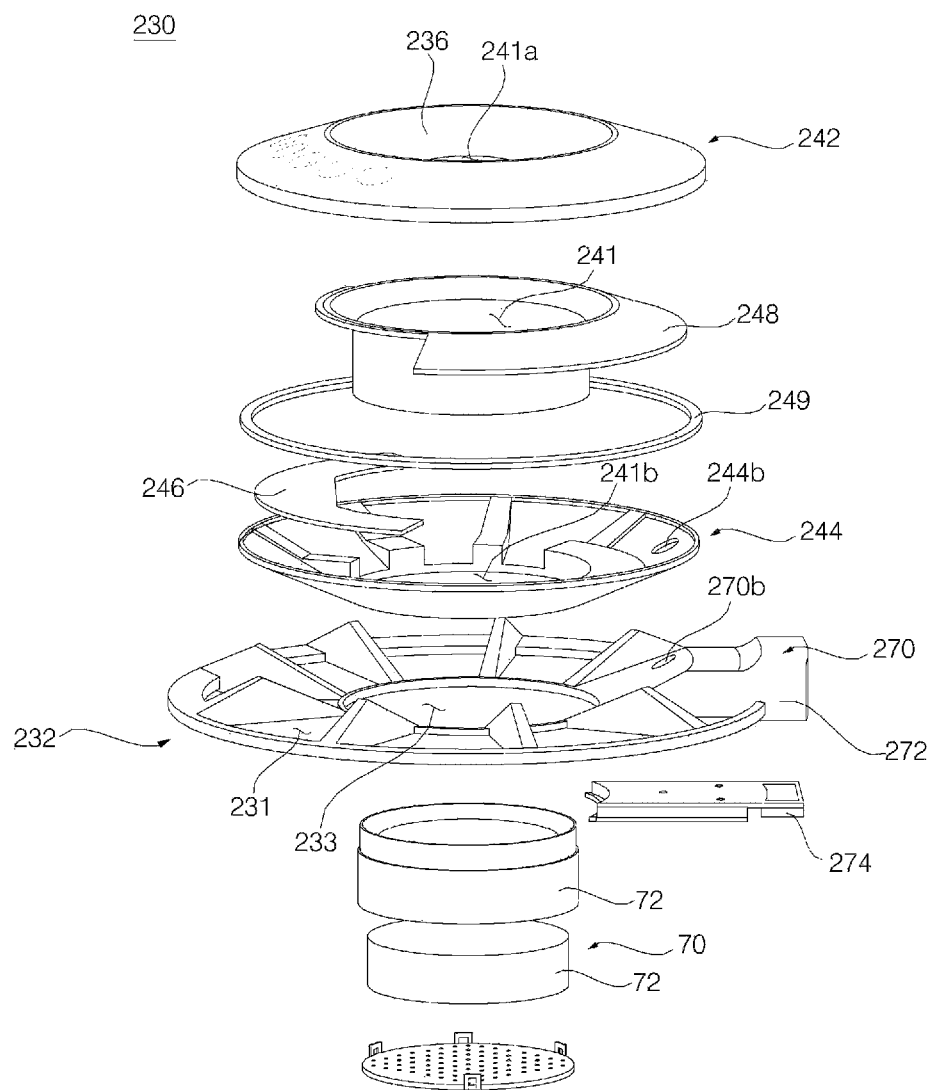
FIG. 14 is an exploded perspective view of FIG. 8.
Figure 15:
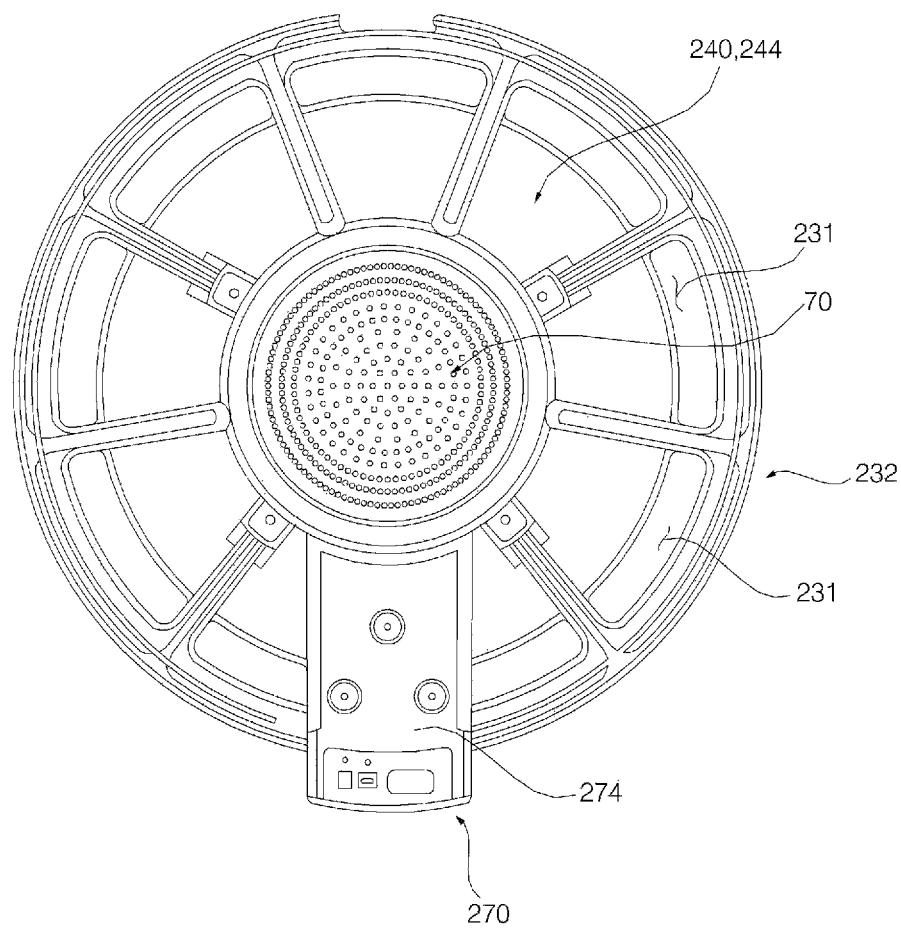
FIG. 15 is a bottom view of FIG. 8.
Figure 16:
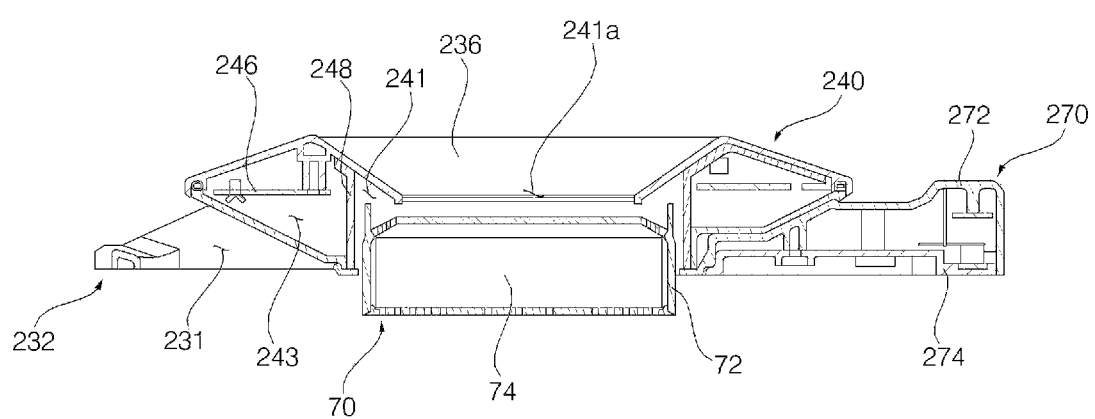
FIG. 16 is a cross-sectional view of FIG. 8.
Figure 17:
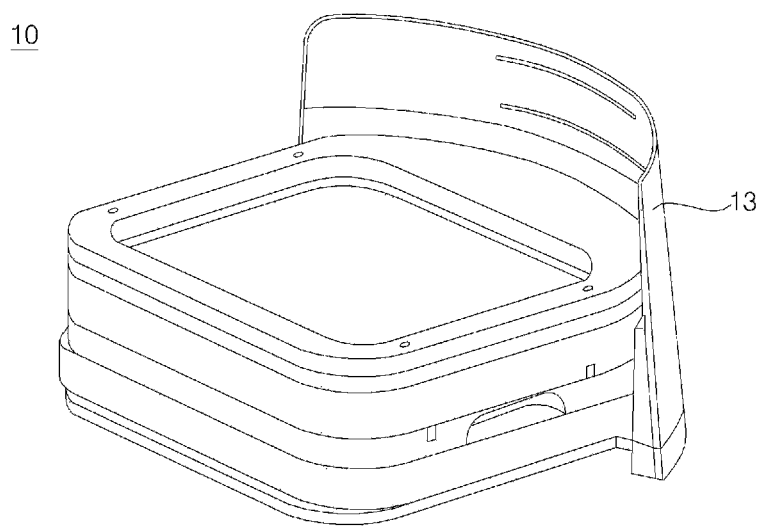
FIG. 17 is a perspective view illustrating a filter assembly shown in FIG. 1.
Figure 18:
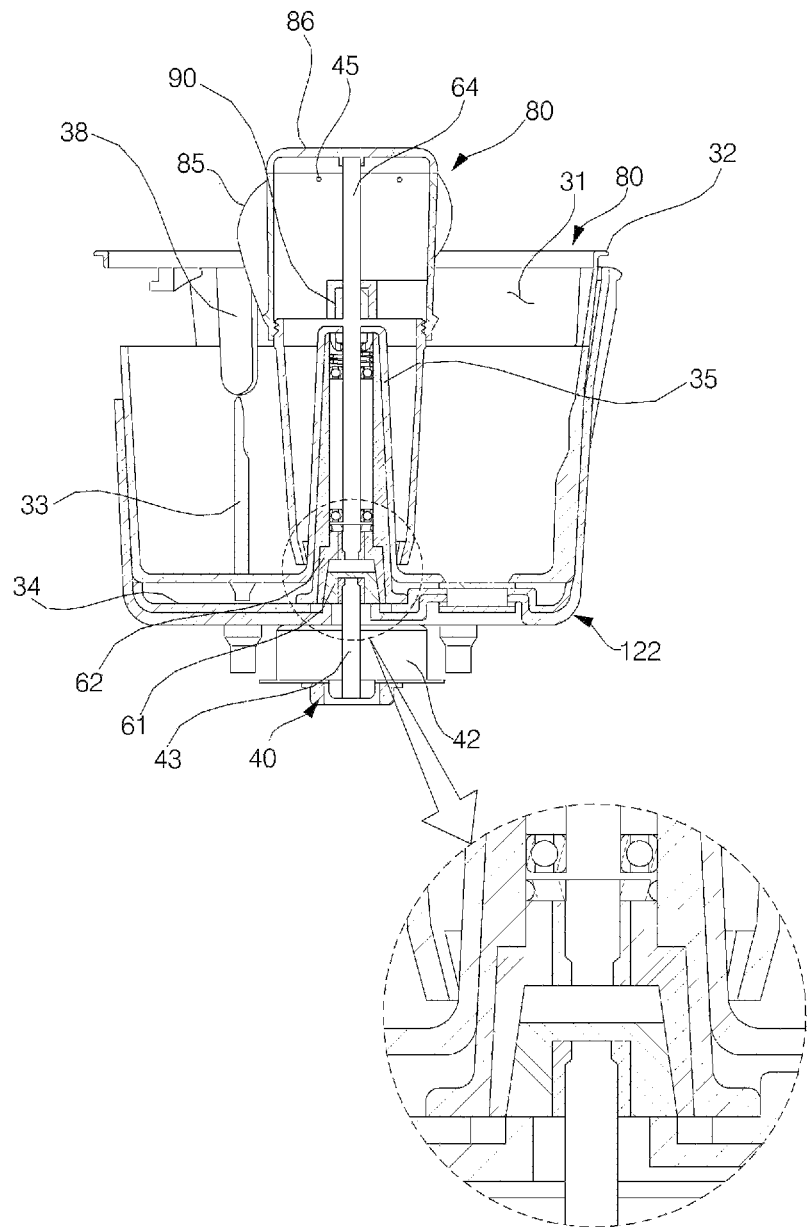
FIG. 18 is a cross-sectional view illustrating a water tank and a watering unit shown in FIG. 5.
Figure 19:
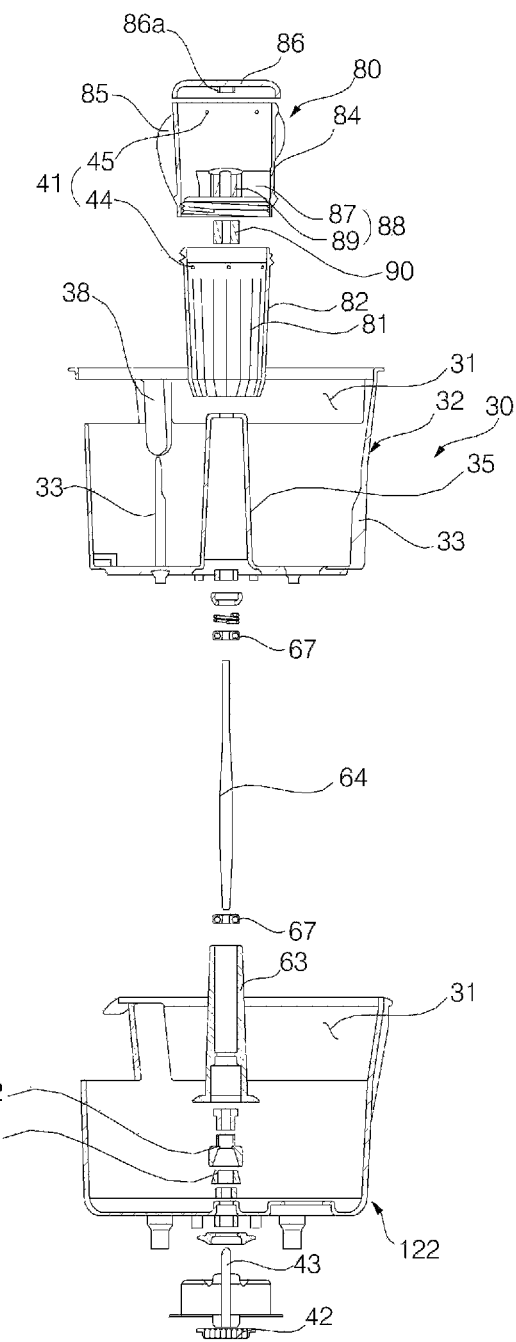
FIG. 19 is an exploded view of FIG. 18.
Figure 20:
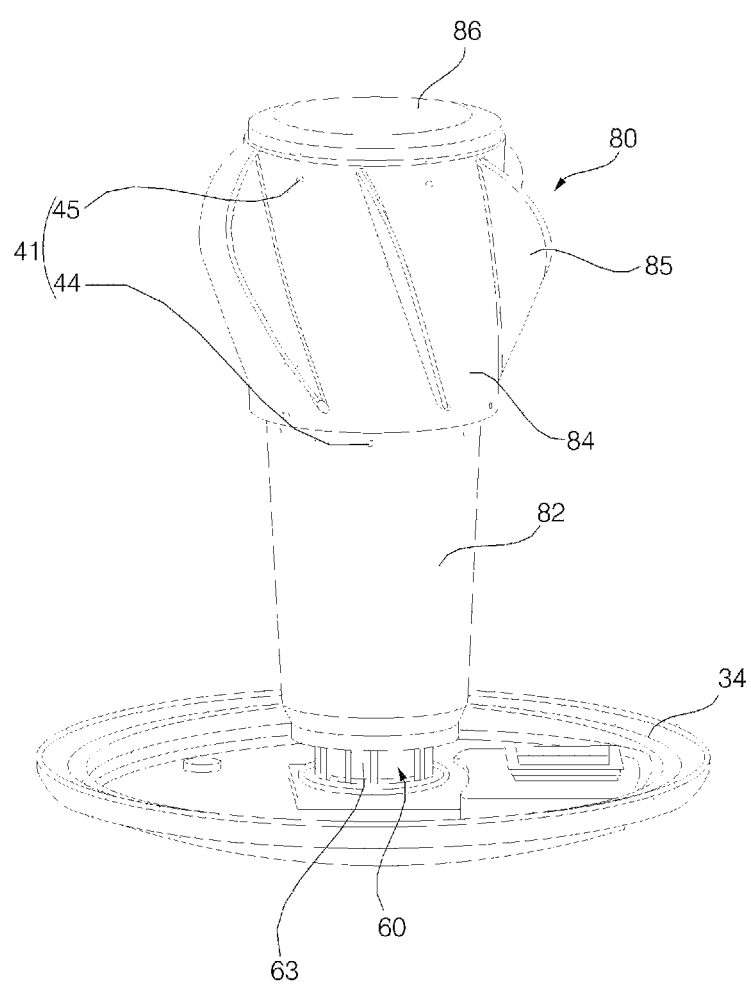
FIG. 20 is a perspective view of a watering unit shown in FIG. 3.
Figure 21:
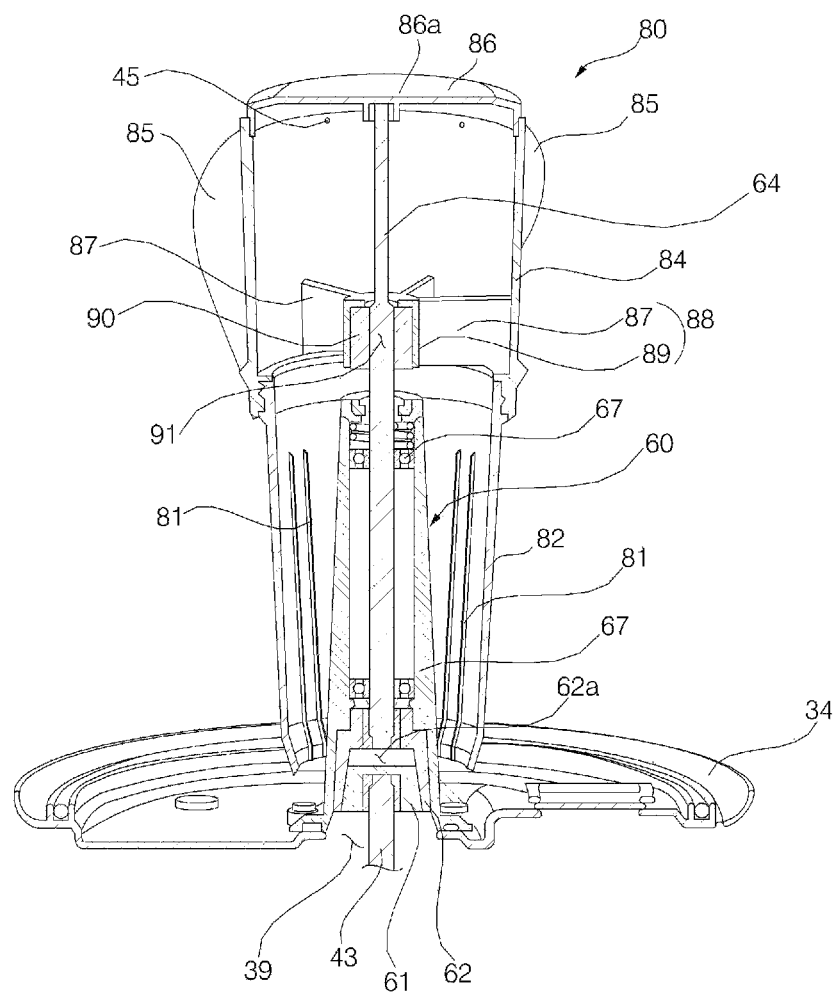
FIG. 21 is a cross-sectional perspective view of FIG. 20.
Figure 22:
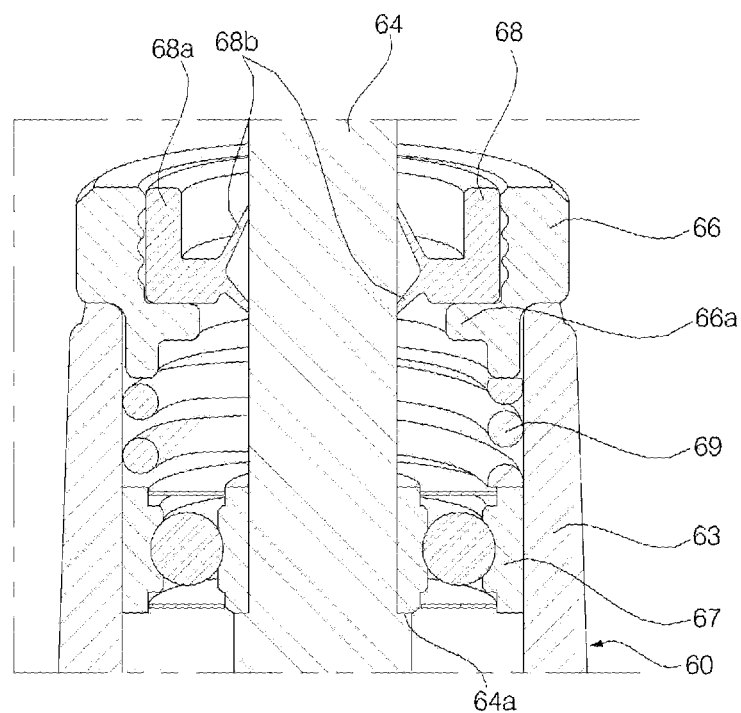
FIG. 22 is a magnified view illustrating a power transmission housing shown in FIG. 21.

Hereinafter, a humidification and air cleaning apparatus will be described with reference to FIGS. 1 to 22.

A humidification and air cleaning apparatus according to an embodiment of the present invention may include a clean module 100 and a humidification module 200 disposed over the clean module 100.

The clean module 100 may take in and filter external air, and may provide filtered air to the humidification module 200.

The humidification module 200 may be supplied with filtered air, may perform humidification to provide moisture, and may discharge humidified air to the outside.

The humidification module 200 may be disposed over the air clean module 100. The humidification module 200 may be separable from the clean module 100.

A user may separate the humidification module 200 from the clean module 100, and then may clean the humidification module 200 and the clean module 100. A user may separate the humidification module 200 from the clean module 100, and then may supply water into the water tank 30 disposed therein. A user may also supply water while the humidification module 200 is stacked on the clean module 100.

When the humidification module 200 is stacked on the clean module, a connection flow passage 103 may be formed to be supplied with filtered air. The connection flow passage formed in the clean module 100 may be defined as a clean connection flow passage 104, and the connection flow passage formed in the humidification module 200 may be defined as a humidification connection flow passage 105.

The clean connection flow passage 104 or the humidification connection flow passage 105 may be manufactured to have a separate space. In this embodiment, instead of a separate space that the clean connection flow passage 104 or the humidification connection flow passage has, the connection flow passage 103 may be formed between the humidification module 200 and the clean module 100 when the humidification module 200 is placed on the clean module 100.

The clean module 100 may include an intake flow passage 101 to receive external air, and may include a filtering flow passage 102 to filter entered air.

The clean module 100 may include a base body 110, a filter assembly 10, and an air blowing unit 20. The base body 110 may include the intake flow passage 101 to receive external air, and may guide external air entered through the intake flow passage 101 to the humidification module 200. The filter assembly 10 may be separably disposed in the base body 110, and may include a filtering flow passage 102 filtering entered external air. The air blowing unit 20 may be disposed inside the base body 110, and may provide a pressure to air that flows.

The display module 160 may be disposed in the base body 110 to display the operational state of the humidification and air cleaning apparatus to a user.

The clean module 100 may be installed at the base 112, and the clean module 100 may be spaced from the base to form the intake flow passage 101.

Since the clean module 100 is spaced from the base 112, external air may be entered through the whole lower side surface of the clean module 100 that is wide. The clean module 100 may upwardly move external air entered from the lower side surface thereof, and may minimize the air resistance generated in this process.

When external air, that is entered, is changed in flow direction, a great air resistance may occur. In this embodiment, since the intake flow passage 101 is upwardly formed from the lower side surface of the clean module 100, the air resistance can be minimized.

The humidification module 200 may include a humidification flow passage 106 that humidifies filtered air passing the clean module 100. Filtered air may be provided with moisture and humidified while passing the humidification flow passage 106.

The humidification module 200 may include a visual body 210 separably stacked on the clean module 100 and formed of a material through which a user can see the inside, a water tank 30 coupled to the visual body 210 and storing water, and a humidification flow passage 106 formed in at least one of the visual body 210 and the water tank 30.

The humidification module 200 may include a top cover assembly 230 separably coupled to the visual body 210. In this embodiment, a discharge flow passage 107 may be formed between the top cover assembly 230 and the visual body 210. The discharge flow passage 107 may be connected to the humidification flow passage 106.

In this embodiment, the humidification module 200 may be separably stacked on the base body 110.

In this embodiment, the humidification flow passage 106 may be formed in the water tank 30. Unlike this embodiment, the humidification flow passage 106 may be formed in the visual body 210. Also, unlike this embodiment, the humidification flow passage 106 may be formed in the visual body 210 and the water tank 30, respectively.

Filtered air supplied to the humidification module 200 through the connection flow passage 103 may be humidified by being supplied with moisture of the water tank 30.

In this embodiment, filtered air may be humidified by water that is naturally evaporated.

In this embodiment, a humidification medium 50 may be installed to effectively generate the natural evaporation of water. The humidification medium 50 may be wetted with water, which is naturally evaporated. In this embodiment, the humidification medium 50 may be wetted with water, but may not be immersed in the water tank 30.

After sufficiently wetting the humidification medium 50, water may flow down to the water tank 30, and may be stored in the water tank 30.

In this embodiment, water inside the water tank 30 may be upwardly pumped and sprayed to wet the humidification medium 50. Also, a nozzle (not shown) may be used to wet the humidification medium 50 with water stored in the water tank 30.

The humidification module 200 may include a watering unit 40 disposed inside the water tank 30, drawing water inside the 30, upwardly pumping drawn water and spraying pumped water to the outside, a humidification medium 50 wetted with water sprayed from the watering unit 40, and a humidification medium housing 220 equipped with the humidification medium 50.

In this embodiment, the watering unit 40 may spray water from the inside to the outside of the water tank 30. Unlike this embodiment, the watering unit 40 may also be configured to spray water from the outside to the inside of the water tank 30.

In this embodiment, the watering unit 40 may spray water toward the visual body 210. Unlike this embodiment, the watering unit 40 may also spray water toward the humidification medium 50.

In this embodiment, the humidification medium housing 220 may be assembled with the visual body 210. Unlike this embodiment, the humidification medium housing 220 may also be assembled with the water tank 30. The installation location of the humidification medium housing 220 may be changed according to the design.

However, the humidification medium 50 may be disposed between the connection flow passage 103 and the discharge flow passage 107. In this embodiment, since humidification is performed using the natural evaporation of the humidification medium 50, the humidification flow passage 106 may be formed by the humidification medium 50.

In this embodiment, filtered air supplied through the connection flow passage 103 may penetrate the humidification medium 50. Unlike this embodiment, filtered air may flow along the surface of the humidification medium 50 instead of penetrating the humidification medium 50.

It may be advantageous for humidification that filtered air penetrates the humidification medium 50.

The humidification flow passage 106 may be formed from the humidification medium 50. In this embodiment, the humidification flow passage 106 may be formed from the humidification medium 50 to a top cover assembly 230 described below.

The humidification module 200 may include the top cover assembly 230 installed at the visual body 210 and separably coupled to the visual body 210.

The top cover assembly 230 may be disposed inside the visual body 210. A discharge flow passage 107 may be formed between the top cover assembly 230 and the visual body 210. Operation signals of a user may be inputted through the top cover assembly 230.

The base body 110 may define the exterior of the clean module 100. The humidification module 200 may be placed on the base body 110. The humidification module 200 may be separable from the base body 110.

The base body 110 may be an assembly of housings.

The base body 110 may include the lower body 130 defining the exterior thereof and having an inlet hole 110 formed in the undersurface thereof, and the support body 120 defining the exterior thereof and coupled to the upper side of the lower body 130.

The horizontal sections of lower body 130 and the support body 120 may be circular.

The lower body 130 may be formed to have a conical shape.

A grip 129 may be formed in the support body 120.

The humidification module 200 may be separably mounted on the upper side of the support body 120.

The filter assembly 10 may be detachably coupled to the base body 110.

A filter housing 140 may be installed in the base body 110 such that the filter assembly 10 is detachably accommodated in the filter housing 140.

The filter housing 140 may be disposed inside the base body 110, and may be coupled to the base body 110. A filtering flow passage 102 may be formed inside the filter housing 140.

A filter installation opening 133 may be formed at one side of the base body 110.

The filter assembly 10 may be inserted into the filter housing 140 through the filter installation opening 133. The filter assembly 10 may include a filter cover 13 that covers the filter installation opening 133.

A blower housing 150 may be disposed inside the base body 110 to guide air discharged out of the air blowing unit 20 to the humidification module 200.

The blower housing 150 may be disposed over the filter housing 140. The blower housing 150 may be coupled to and fixed to the filter housing 140.

An air blowing unit 20 may be disposed between the filter housing 140 and the blower housing 150.

The air blowing unit 20 may provide a pressure that allows air to flow.

External air may be entered in all directions of 360 degrees through the intake flow passage 101.

In order to separate the base 112 from the base body 110, a bridge frame 115 may be disposed between the base body 110 and the base 112. The bridge frame 115 may couple the base 112 and the base body 110, and may support the base body 110.

External air may pass the bridge frame 115, and may flow to the inlet hole 111.

A plurality of bridges 114 may be disposed on the bridge frame 115 in upward and downward directions. The bridges 114 may be densely disposed such that the fingers of a user cannot enter the inlet hole 111. Considering only the air resistance, the number of bridges 114 may be minimized.

In this embodiment, the filter assembly 10 may be disposed in the lower body 130 of the base body 110, and may be attachable and detachable to/from the lower body 130. The filter assembly 10 may be separated from the lower body 130 in a horizontal direction. The filter assembly 10 may be disposed orthogonally to the flow of air.

The filter assembly 10 may be detachably coupled to the filter housing 140. The filter assembly 10 may be disposed so as to cross the filtering flow passage 102.

The filtering flow passage 102 may be formed in upward and downward direction, and the filter assembly 10 may be disposed in a horizontal direction. If the filter assembly 10 is disposed so as to cross the filtering flow passage 102, the filter assembly 10 may sufficiently function.

The filtering flow passage 102 may be formed from the lower side to the upper side, in an opposite direction to the gravity direction. The flow direction may not be changed, and may be formed in a straight-line as much as possible.

The filter assembly 10 may include a plurality of filters horizontally installed and vertically stacked.

Air entered through the intake flow passage 101 may flow to the air blowing unit 20 through the inside of the filter housing 140.

The air blowing unit 20 may be disposed over the filter housing 140, and may blow air of the filtering flow passage 102 to discharge air into the humidification module 200.

The air blowing unit 20 may include a blower motor 22 and a blower fan 24.

In this embodiment, the blower motor 22 and the blower fan 24 may be disposed between the blower housing 150 and the filter housing 140. The blower motor 22 may be disposed at an upper side, and the blower fan 24 may be disposed at a lower side.

The blower motor 22 may be disposed on the blower housing 150, and may be supported by the blower housing 150. The blower fan 24 may be assembled with the blower motor 22, and may receive a driving force of the blower motor 22 to rotate. The blower fan 24 may be disposed at the side of the filter housing 140.

In order to minimize the installation space, at least a portion of the blower motor 22 may be inserted into the blower housing 150, and at least a portion of the blower fan 24 may be inserted into the filter housing 140.

The blower fan 24 may blow filtered air to the center thereof, and may discharge filtered air in a circumferential direction.

In this embodiment, the blower motor 22 may be disposed over the blower fan 24 so as not to generate an air resistance. The blower motor 22 may be disposed away from the flow path of air.

Air discharged from the blower fan 24 may upwardly flow along the filter housing 140 and the blower housing 150. Air discharged from the blower fan 24 may flow to the support body 120.

The support body 120 may be disposed over the blower housing 150. Also, the support body 120 may be located on the lower body 130. The support body 120 may be coupled to the lower body 130, and may be integrated with the lower body 130. According to the shape of the base body 110, the support body 120 and the lower body 130 may be manufactured into one body.

The humidification module 200 may be placed on the support body 120. The support body 120 may have a concave shape such that the water tank 30 can be inserted into the inside of the support body 120.

The support body 120 may include a support inner body 122, a support outer body 128, and a support guide 124. The support inner body 122 may allow the water tank 30 inserted therein, and may include a humidification flow passage inlet 123 formed therein. The support outer body 128 may be coupled to the support inner body 122, may be located outside the support inner body 122, and may be coupled to the lower body 130. The support guide 124 may be disposed between the support inner body 122 and the support outer body 128, and may guide air to the humidification flow passage inlet 123.

The support inner body 122 may be formed to be opened at the upper side thereof, and may allow the water tank 30 inserted therein. The support inner body 122 may have the humidification flow passage inlet 123 which filtered air flows into. In this embodiment, the humidification flow passage inlet 123 may be formed in a side wall of the support inner body 122. Air passing the humidification flow passage inlet 123 may flow into the water tank 30.

The support inner body 122 may have a basket shape on the whole. The support inner body 122 may have a circular shape in horizontal section, and the humidification flow passage inlet 123 may be formed in all directions of 360 degrees.

The support guide 124 may be a component for guiding filtered air to the humidification flow passage inlet 123, and may be omitted in accordance with embodiments. The support guide 124 may be fixed to the support inner body 122 or the support outer body 128.

In this embodiment, the support guide 124 may be formed to cover the support inner body 122. Accordingly, the upper end of the support guide 124 may adhere closely to the upper end of the support inner body 122.

The area of the upper side surface of the support guide 124 which is opened may be equal to the area of the upper side surface of the support inner body 122 which is opened.

In this embodiment, a support inner body ring 126 may be formed on the upper end of the support inner body 122 to support the support guide 124.

The diameter of the support inner body ring 126 and the diameter of the support guide 124 may be the same as or similar to each other. The support guide 124 and the support inner body ring 126 may adhere closely to each other to prevent leakage of filtered air. The support inner body ring 126 may be disposed inside the support guide 124.

The support guide 124 may be located between the support inner body 122 and the support outer body 128. The support guide 124 may collect filtered air introduced between the support inner body 122 and the support outer body 128, and may guide filtered air to the humidification flow passage inlet 123.

A grip 129 may be formed on the support outer body 128. The whole of the humidification and air cleaning apparatus can be lifted through the grip 129.

The support inner body 122 may have a water tank insertion space 125 formed therein such that the water tank 30 can be inserted into the support inner body 122.

The humidification flow passage inlet 123 may communicate with the inside of the water tank 30. In this embodiment, the humidification medium 50 may be disposed inside the humidification flow passage inlet 123.

A watering motor 42 of the watering unit 40 described later may be installed at the support body 120. The watering motor 42 may be physically separated from the blower motor 22.

The watering motor 42 may be fixed to the outside of the support inner body 122 through a watering bracket 126. In this embodiment, the watering motor 42 may be fixed to the undersurface of the support inner body 122. In this embodiment, the driving force of the watering motor 42 may be delivered to the inside of the water tank 30 through the support inner body 122.

In this embodiment, the watering motor 42 and the blower motor 22 may be separately installed at different structures, and thus vibration may be prevented. In this embodiment, the watering motor 42 may be installed at a support body 120, and the blower motor 22 may be installed at the blower housing 150. Through this, when two motors 22 and 42 operate at the same time, resonance and vibration may be minimized.

The blower motor 22 and the watering motor 42 may be controlled separately.

Meanwhile, an outer visual body 214 may be coupled to the upper side of the support body 120.

The outer visual body 214 may be a component of the visual body 210, but in this embodiment, may be fixed to the support body 120. Unlike this embodiment, the outer visual body 214 may also be fixed to the humidification module 200. Unlike this embodiment, the outer visual body 214 may be omitted.

The outer visual body 214 may be fixed to the support body 120. In this embodiment, the outer visual body 214 may be coupled to the support outer body 128.

The outer visual body 214 and the support outer body 128 may form a continuous surface. The outer visual body 214 may be formed of a material through which a user can see the inside of the outer visual body 214. The outer visual body 214 may be formed of a transparent or translucent material.

The humidification module 200 may be separable from the clean module 100. A user may separate the humidification module 200 from the clean module 100 by lifting up the humidification module 200. When the water tank 30 is cleaned and the humidification medium 50 is replaced, a user may easily separate the humidification module 200 from the clean module 100 by lifting the humidification module 200.

In this embodiment, the humidification module 200 may be largely divided into the water tank 30, the visual body 210, and the top cover assembly 230.

The water tank 30 and the visual body 210 which constitute the humidification module 200 may be coupled to each other. In this embodiment, the water tank 30 may be inserted into the clean module 100, and may not be exposed to the outside. A user can see the inside of the water tank 30 through the visual body 210.

The water tank 30 may be inserted into the water tank insertion space 125 of the support body 120. The water tank 30 may have an upper side thereof opened. A water tank inlet 31 that communicates with the humidification flow passage inlet 123 may be formed in the water tank 30. The number of the humidification flow passage inlets 123 and the number of the water tank inlets 31 may correspond to each other. The water tank inlet 31 may be disposed inside the humidification flow passage inlet 123.

The water tank 30 may include a water tank body 32, a water tank inlet 31, a column 35, a water tank supply guide 38, and a water tank rib 33. The water tank inlet 31 may be formed in the side surface of the water tank body. The column 35 may be disposed inside the water tank body 32, and may upwardly protrude. The water tank supply guide 38 may be formed on the water tank body 32, may divide the water tank inlet 31, and may guide water flowing down from the humidification medium 50 to the inside of the water tank body 32. The water tank rib 33 may protrude from the inner side surface of the water tank body 32.

In this embodiment, the water tank body 32 may be formed into a cylindrical shape. Unlike this embodiment, the water tank body 32 may be formed into various shapes.

In this embodiment, the water tank 30 may include a water tank base 34.

The column 35 may be formed at the water tank body 32, and a power transmission module 60 described later may be disposed inside the column 35. The column 35 may inhibit water stored in the water tank body 32 from contacting the power transmission module 60.

The water tank base 34 may be coupled to the outer undersurface of the water tank body 32.

A water level sensor 37 may be disposed in the water tank body 32 to sense the water level of stored water. The water level sensor 37 may be installed in plurality.

The water tank inlet 31 may be formed in the side surface of the water tank body 32. The water tank inlet 31 may be formed to receive air in all directions of 360 degrees with respect to the water tank body 32.

The water tank inlet 31 may be connected to the humidification flow passage inlet 123 of the support body 120. The water tank inlet 31 may be disposed inside the humidification flow passage inlet 123. The water tank inlet 31 and the humidification flow passage inlet 123 may face each other. The water tank inlet 31 may be used as the humidification connection flow passage 105. The humidification medium 50 may be disposed inside the water tank inlet 31.

The water tank rib 33 may be formed on the inner side surface of the water tank rib 32, and may be formed in upward and downward directions. The water tank rib 33 may act as a resistance against water rotating along the inner side surface of the water tank body 32.

When the watering unit 40 operates, the water tank rib 33 may inhibit stored water from rotating inside the water tank body 32. When the watering unit 40 operates and thus stored water rotates, the water level may rise. The water tank rib 33 may minimize the rise of the water level.

In this embodiment, the water tank supply guide 38 may be disposed in three, and the water tank inlet 31 may also be disposed in three.

A water tank upper ring 36 may be formed at the upper end of the water tank 30. The water tank supply guide 38 and the water tank inlet 31 may be located under the water tank upper ring 36. The water tank upper ring 36 may be fixed to the visual body 210.

The column 35 may upwardly protrude from the bottom of the inside of the water tank body 32. The column 35 may be hollow inside. The power transmission module 60 described later may be installed inside the column 35.

The visual body 210 may be integrally fixed to the water tank 30. In this embodiment, the visual body 210 may be fixed to the water tank upper ring 36. Air flowing into the inside of the water tank 30 through the water tank inlet 31 may flow to the upper side along the visual body 210.

The visual body 210 may form a continuous surface with the water tank 30, and may minimize the air resistance.

The outer visual body 214 may be disposed outside the visual body 210 in a radial direction. Unlike this embodiment, the outer visual body 214 may be omitted. In this embodiment, the visual body 210 may be used as an inner visual body. The visual body 210 may be formed of a transparent or translucent material.

The visual body 210 may have upper and lower sides thereof opened. In this embodiment, the upper aperture plane of the visual body 210 may be formed wider than the lower aperture plane thereof.

The visual body 210 may be formed to have a hopper shape. The visual body 210 may be inserted into the outer visual body 214. The upper end of the 210 may adhere closely to the upper end of the outer visual body 214.

The visual body 210 may include an upper guide groove 215 formed in the inner side surface thereof, a lower guide groove 217 formed in the inner side surface thereof, an upper outlet 216 formed in the upper guide groove 215 and opened to the inside, a lower outlet 218 formed in the lower guide groove 217 and opened to the inside, and a connect opening 213 opened in a vertical direction.

The upper guide groove 215 may be formed in an inner side surface of the visual body 210, and may be formed along the inner side surface of the visual body 210. In this embodiment, the upper guide groove 215 may be circular when viewed from top. The upper guide groove 215 may be formed into a concave groove.

A lift 250 that is used to lift the humidification module 200 may be installed at the upper guide groove 215. The lift 250 may include a lift frame 252 inserted into the upper guide groove 215 and fixedly coupled to the visual body 210, and a lift bar 254 pin-coupled to the lift frame 252 and installed rotatably.

The lift frame 252 may be inserted into the upper guide groove 215, and then a coupling member may fixedly couple the lift frame 252 and the visual body 210.

The lift bar 254 may be formed into an arc shape of about 180 degrees, and may be pin-coupled to the lift frame 252. The lift bar 254 may be rotatable in upward and downward directions.

When not used, the lift bar 254 may be accommodated in the upper guide groove 215. In order to prevent the lift bar 254 from protruding out of the upper guide groove 215, when accommodated in the upper guide groove 215, the lift bar 254 may form a continuous surface with the lift frame 252.

In order to form the continuous surface with the lift bar 254 that is accommodated, the lift frame 252 may have a lower height at a side where the lift bar 254 is accommodated.

The upper guide groove 215 and the lower guide groove 217 may guide water in a horizontal direction. The upper outlet 216 may be formed in the upper guide groove 215, and may be inwardly opened. The upper outlet 216 may guide water dropping into the upper guide groove 215 to the inner side surface of the visual body 210. The upper outlet 216 may be disposed in plurality.

The lower guide groove 217 may be formed to have a downwardly concave shape like the upper guide groove 215. The lower outlet 218 that discharges water may also be formed in plurality in the lower guide groove 217.

In this embodiment, the humidification medium housing 220 may be placed in the lower guide groove 217. The humidification medium housing 220 may be inserted into the inside of the visual body 210, and the upper end of the humidification medium housing 220 may be placed in the lower guide groove 217.

Meanwhile, the connect opening 213 may penetrate the visual body 210 in upward and downward directions. In this embodiment, the connect opening 213 may be formed on the same plane as the upper guide groove 215. A connector 260 that is electrically connected to the top cover assembly 230 may be inserted into the connect opening 213.

In this embodiment, water discharged from the watering unit 40 may collide with the inner side surface of the visual body 210. More specifically, water may collide with the inner side surface between the upper guide groove 215 and the lower guide groove 217, and then may flow down.

Accordingly, water flowing down along the inner side surface of the visual body 210 may be stored in the lower guide groove 217. Water stored in the lower guide groove 217 may flow down to the water tank 30 or the humidification medium housing 220 through the lower outlet 218.

In order to prevent water flowing down from the lower outlet 218 from dropping into the water tank 30, the lower outlet 218 and the water tank supply guide 38 of the water tank 30 may be connected to each other.

The lower outlet 218 and the water tank supply guide 38 may form a dropping water preventing flow passage.

That is, the water tank supply guide 38 may be disposed under the lower outlet 218, and water may be stored in the water tank 30 along the inner side surface of the water tank 30. When the lower outlet 218 and the water tank supply guide 38 are not formed, water flowing over the lower guide groove 217 may drop into the water tank 30, and water dropping onto the water surface of the water tank 30 may cause noise.

Water flowing down along the dropping water preventing flow passage may wet the humidification medium 50 installed in the humidification medium housing 220. Water sprayed from the watering unit 40 in accordance with the operation of the watering unit 40 may directly wet the humidification medium 50.

In this embodiment, a visual space 211 may be formed between the outer visual body 214 and the visual body 210.

When the humidification module 200 is placed on the clean module 100, the visual space 211 may be sealed. When the humidification module 200 is separated from the clean module 100, the visual space 211 may be opened.

Since the horizontal sections of the visual body 210 and the outer visual body 214 are circular, the visual space 211 may have a ring shape. When the horizontal sections of the visual body 210 and the outer visual body 214 are changed, the shape of the visual space 211 may also be changed.

In this embodiment, the display module 160 may be disposed in the visual space 211. Information displayed on the display 160 may be delivered to a user through the outer visual body 214. When the outer visual body 214 is omitted, the display 160 may be located outside the visual body 210.

The display 160 may be disposed in the visual space 211, and may be fixed to the outer visual body 214. When the humidification module 200 is separated, the visual body 210 may be separated from the display 160.

The display 160 disposed in the visual space 211 may be inhibited from contacting water and air. When the humidification module 200 is placed, the visual space 211 may be sealed by the visual body 210. Accordingly, the display 160 can prevent an electric leakage, and can inhibit corrosion by minimizing influences of humidity.

Particularly, when water is supplied from the outside through the top cover assembly 230 described later, supplied water may not contact the display 160. Supplied water may flow down to the inside of the visual body 210, or may flow down to the outside of the outer visual body 214.

In this embodiment, the display 160 may have a ring shape. Unlike this embodiment, the display 160 may be formed into an arc shape.

The display 160 may include a display PCB 162 and a display cover 164. The display cover 164 may be coated with a material that can reflect light. Accordingly, when water drops are formed on the visual body 210, water drops formed on the visual body 210 may also be projected onto the surface of the display 164. When the water drops formed on visual body 210 flows down, the same effect is also projected on the display 164.

This effect may give a user a visual stimulus, and a user can intuitively recognize the operation of the watering unit 40 described later through flowing down of water. That is, due to a change of an image projected on the display cover 164, a user can intuitively know that humidification is being performing.

The humidification medium 50 that is wetted with water and naturally evaporates water may be disposed inside the humidification module 200. The humidification medium 50 may be installed in the humidification medium housing 220, and the humidification medium housing 220 may be separably installed in the visual body 210 in this embodiment.

The upper end of the humidification medium housing 220 may be seated in the visual body 210. The humidification medium housing 220 may be seated on the lower end of the visual body 210, and may be inserted into the inside of the water tank 30. In this embodiment, the humidification medium housing 220 may be separably seated in the lower guide groove 217, and may be inserted into the inside of the water tank 30. The humidification medium housing 220 may be inserted into the inside of the water tank 30, but may not be immersed in water of the water tank.

The humidification medium housing 220 may be a structure for fixing the humidification medium 50. The humidification medium housing 220 may be formed into a frame form in order to maximize the contact area with air.

The humidification medium 50 may make contact with filtered air while being fixed to the humidification medium housing 220. In this embodiment, filtered air may pass through the humidification medium 50. Filtered air may flow from the outside to the inside of the humidification medium 50, and may flow from the outside to the inside of the water tank 30.

The humidification medium 50 may naturally evaporate water while being wetted with water. Filtered air passing through the humidification medium 50 may promote the natural evaporation of water. The humidification medium 50 may be manufactured by a weaving process. The humidification medium 50 may include a great number of pores through which air passes.

The humidification medium 50 may be located at the inner side of the water tank inlet 31. The humidification medium 50 and the water tank inlet 31 may be disposed to face each other. The humidification medium 50 may be formed into a ring shape.

The humidification medium housing 220 may be placed on the visual body 210. In this embodiment, the humidification medium housing 220 may be placed inside the visual body 210, and may be separated from the visual body 210. The humidification medium housing 220 may be placed on the visual body 210, and may be inserted into the inside of the water tank 30.

The humidification medium housing 220 may be seated on the lower end of the visual body 210 to be located inside the water tank 30. In this embodiment, the humidification medium housing 220 may minimize exposure to the outside.

The humidification medium housing 220 may not be immersed in water stored in the water tank 30. Even when the level of water stored in the water tank 30 is full, the humidification medium housing 220 may not be immersed in water.

Since the humidification medium housing 220 is disposed so as not to be immersed in water, the humidification medium 50 may be dried. That is, according to circumstances, the humidification medium 50 may be maintained at a dry state. When the humidification module 200 does not operate, the humidification medium 50 may be dried. Accordingly, propagation of molds or harmful bacteria can be inhibited.

The humidification medium housing 220 may include an inner medium frame 222 and an outer medium frame 224. In this embodiment, the humidification medium 50 may be installed between the inner medium frame 222 and the outer medium frame 224.

The diameter of the outer medium frame 224 may be larger than the diameter of the inner medium frame 222, and the humidification medium 50 may be fixedly interposed between the outer medium frame 224 and the inner medium frame 222.

An inner medium inlet 221 through which air passes may be formed in the inner medium frame 222. An outer medium inlet 223 through which air passes may be formed in the outer medium frame 224.

The inner medium inlet 221 and the outer medium inlet 223 may be formed to receive air in all directions of 360 degrees.

The inner medium inlet 221 and the outer medium inlet 223 may be disposed to face each other.

Filtered air supplied through the connection flow passage 103 may flow into the water tank 30 by sequentially passing the water tank inlet 31, the outer medium inlet 223, the humidification medium 50 and the inner medium inlet 221.

The water tank inlet 31, the outer medium inlet 223, the humidification medium 50 and the inner medium inlet 221 may be sequentially disposed from the outside, and the respective components may be stacked in a horizontal direction.

Meanwhile, the top cover assembly 230 may be separably installed in the visual body 210. A user may separate the top cover assembly 230 from the visual body 210, and then may clean the inside of the visual body 210.

When the top cover assembly 230 is placed on the visual body 210, the top cover assembly 230 may be coupled to the connector 260, and may be electrically connected to the connector 260 to be supplied with power.

In this embodiment, the top cover assembly 230 may be located inside the visual body 210, and may be placed in the upper guide groove 215. Also, the top cover assembly 230 may form the discharge flow passage 107 with the visual body 210 in between.

In this embodiment, an operation module 240 may be installed at the top cover assembly 230. The operation module 240 may receive an operation signal through a touch action of a user. The power for the operation module 240 may be supplied through the connector 260. When the top cover assembly 230 is separated, power applied to the operation module 240 may be cut off.

The operation signal of a user inputted into the operation module 240 may be wiredly or wirelessly delivered to a controller (not shown).

In case of wire communication, electrical signals may be delivered through a physical connection of the operation module 240 and the connector 260.

In case of wireless communication, wireless signals of the operation module 240 may be delivered to the controller. The wireless signals may be delivered through various radio signals such as WiFi, Bluetooth, and IR signal.

In this embodiment, a transmitter (not shown) may be disposed in the operation module 240, and a receiver (not shown) may be disposed in the connector 260. An operation signal inputted into the operation module 240 may be delivered to the receiver of the connector 260 through an IR frequency.

When the receiver of a wireless signal is disposed in the connector 260, the transmission distance can be minimized, and thus power consumption can be minimized.

A water supply flow passage 109 may be formed in the top cover assembly 230 to supply water from the outside.

The top cover assembly 230 may include a discharge grille 232, an operation module 240, a water filter 70, and a top connector 270. The discharge grille 232 may include a grille discharge port 231 forming at least a portion of the discharge flow passage 107, and a grille water supply port 233 forming at least a portion of the water supply flow passage 109. The operation module 240 may be stacked over the discharge grille 232, may communicate with the grille water supply port 233, may include an external water supply port 239 forming at least a portion of the water supply flow passage 109 and guiding water supplied from the outside to the water tank 30, and may receive an operation signal of a user. The water filter 70 may be coupled to the discharge grille 232, and may purify water supplied from the outside. The top connector 270 may electrically connect the connector 260 and the operation module 240.

In this embodiment, the water supply flow passage 109 may be formed in the top cover assembly 230. The water filter 70 may be installed at the water supply flow passage 109.

The discharge grille 232 may include a plurality of grille discharge ports 231 formed therein and opened in upward and downward directions. The discharge grille 232 may include a grille water supply port 233 formed therein and opened in upward and downward directions.

In this embodiment, the grille water supply port 233 may be disposed at the center of the discharge grille 232, and the grille discharge port 231 may be disposed around the grille water supply port 232.

The grille discharge port 231 may be radially disposed around the grille water supply port 233. The discharge grille 232 may have a circular shape when viewed from top, and the grille discharge port 231 may be disposed in plurality along the circumferential direction.

A humidification medium 55 may be additionally installed under the top cover assembly 230. In this embodiment, the humidification medium 50 installed inside the water tank 30 may be defined as a first humidification medium 50, and the humidification medium 55 installed at the top cover assembly 230 may be defined as a second humidification medium 55.

In this embodiment, the second humidification medium 55 may be disposed under the discharge grille 232.

The second humidification medium 55 may cover the grille discharge port 231 of the discharge grille 232. The second humidification medium 55 may additionally humidify air passing the grille discharge port 231. Unlike this embodiment, the second humidification medium 55 may be installed inside the top cover assembly 230.

In this embodiment, the second humidification medium 55 may cover the whole of the grille discharge port 231 except the grille water supply port 233. The second humidification medium 55 may be formed into a donut shape.

The second humidification medium 55 may be wetted with water colliding with and rebounded from the visual body 210. Unlike this embodiment, the watering unit 40 may be configured to spray water toward the second humidification medium 55.

Meanwhile, the water filter 70 may be installed at the grille water supply port 233. The water filter 70 may purify water that is supplied. The water filter 70 may purify hard water into soft water. The water filter 70 may also filter water supplied from the outside to remove foreign substances.

The water filter 70 may include a filter housing 72 and a filter medium 74 disposed inside the filter housing 72. The filter housing 72 may be fitted into and fixed to the grille water supply port 233. The filter housing 72 may be separable from the top cover assembly 230.

In this embodiment, the filter housing 72 may have a cylindrical shape corresponding to the horizontal sectional shape of the grille water supply port 233.

When the top connector 270 is placed over the top connector 260, the top connector 270 may be electrically connected to the connector 260. The top connector 270 may be disposed in the operation module 240, and may be manufactured integrally with the operation module 240. In this embodiment, the top connector 270 may be disposed at the discharge grille 232.

When the top cover assembly 230 is placed on the visual body 210, the top connector 270 may be connected to the connector 260 protruding to the connect opening 213. The top connector 270 may provide power to the operation module 240, and may deliver an operation signal inputted into the operation module 240 to the controller.

The water supply flow passage 109 may be formed in the control module 240. A portion of the water supply flow passage 109 may be formed at the center of the operation module 240 in a vertical direction. An operation water inlet 241 may be formed at the center of the operation module 240 in upward and downward directions.

The operation module 240 may include a lower operation housing 244, an upper operation housing 242, an input unit 245, and an operation signal processor 246. The lower operation housing 244 may be assembled with the discharge grille 232, and may form a portion of the operation water inlet 241 inside. The upper operation housing 242 may be assembled with the upper portion of the lower operation housing 244 to form an operation space 243, and may form the other portion of the operation water inlet 241 inside. The input unit 245 may be disposed in the upper operation housing 242, and may receive an operation signal from a user. The operation signal processor 246 may be disposed in the operation space 243, and may process the signal of the input unit 245.

In this embodiment, a middle operation housing 248 may be disposed between the upper operation housing 242 and the lower operation housing 244. The middle operation housing 248 may have the operation water inlet 241 formed therein.

The upper operation housing 242 may have an upper water supply opening 241a connected to the operation water inlet, and the lower operation housing 244 may have a lower water supply opening 241b connected to the operation water inlet 241.

The operation water inlet 241 may communicate with the upper water supply opening 241a and the lower water supply opening 241b.

The operation water inlet 241 that longitudinally extends in upward and downward directions may be formed inside the middle operation housing 248. The water filter 70 may be assembled with the operation water inlet 241.

At least a portion of the upper operation housing 242 may be formed into an external water supply guide 236. The external water supply guide 236 may collect water supplied from the outside into the upper water supply opening 241a.

The upper water supply opening 241a may be formed inside the external water supply guide 236. The area of the upper water supply opening 241a may be formed smaller than the area of the operation water inlet 241. Accordingly, water guided along the external water supply guide 236 may be wholly guided to the inside of the operation water inlet.

The middle operation housing 248 may prevent supplied water from flowing over into the operation space 243.

In this embodiment, the operation space 243 may be formed among the upper operation housing 242, the lower operation housing 244, and the middle operation housing 248.

The operation space 243 may be sealed to prevent infiltration of water. For this, a gasket 249 may be disposed between the upper operation housing 242 and the lower operation housing 244.

A connector connection hole 244b for connection with the top connector 270 may be formed in the lower operation housing 244. Also, a connector connection hole 270b that corresponds to the connector connection hole 244b may be formed in the top connector 270.

The top connector 270 may include a top connector housing 272 and a top connector cover 274. In this embodiment, the top connector housing 272 may be manufactured integrally with the discharge grille 232. The top connector housing 272 may have a lower side surface thereof opened. The top connector cover 274 may be assembled with the top connector housing 272 that is opened.

The watering unit 40 may pump water of the water tank 30, and then may spray water to the visual body 210. In this embodiment, water sprayed from the watering unit 40 may flow down along the visual body 210, and may wet the humidification medium 50. Water sprayed from the watering unit 40 may also directly wet the humidification medium 50. Water remaining after wetting the humidification medium 50 may flow to the water tank 30 along the dropping water preventing flow passage.

The watering unit 40 may include a watering housing 80 disposed inside the water tank 30, drawing the water of the water tank 30 into the inside as rotating, pumping the drawn water upwardly, and discharging the pumped water to the outside, a watering motor 42 for providing a torque to the watering housing 80, and a power transmission module 60 for delivering a torque of the watering motor 42 to the watering housing 80.

A watering groove 81 may be formed at the inner side surface of the watering housing 80. The watering groove 81 may improve the pumping efficiency. The watering groove 81 may protrude from the inner side surface of the watering housing 80. The watering groove 81 may longitudinally extend in upward and downward directions. The watering groove 81 may be radially disposed around the watering motor shaft 43.

In this embodiment, the watering housing 80 and the watering motor 42 may be a separable structure. The watering housing 80 may be installed inside the humidification module 200, and the watering motor 42 may be installed inside the clean module 100. When the humidification module 200 is separated, the watering housing 80 may be separated from the clean module 100 together with the water tank 30.

For a separation structure of the watering housing 80 and the watering motor 42, in this embodiment, the power transmission module 60 may be designed to be separable. The power transmission module 60 may deliver power, and may include separable couplers 61 and 62.

A coupler coupled to the watering motor 42 may be defined as a first coupler 61, and a coupler disposed in the humidification module 200 and delivering a torque to the watering housing 80 may be defined as a second coupler 62.

The watering motor 42 may be installed at the undersurface of the support body 120. The watering motor 42 may be located over the blower motor 22, and may be spaced from the blower motor 22.

A watering motor shaft 43 of the watering motor 42 may be installed to penetrate the support body 120. In this embodiment, the watering motor shaft 43 may penetrate the support inner body 122 in a vertical direction.

The first coupler 61 may be installed on the upper end of the watering motor shaft 43. Accordingly, the first coupler 61 may be disposed over the support inner body 122. The watering motor 42 may be disposed under the support inner body 122, and the first coupler 61 may be disposed over the support inner body 122. The watering motor shaft 43 may penetrates the support inner body 122.

The first coupler 61 may be disposed to upwardly protrude from the bottom of the inside of the support inner body 122. The first coupler 61 may be formed with a section that becomes narrower as it goes upwardly. The first coupler 61 may be formed into a conical shape. A teeth shape may be formed at the outer circumferential surface of the first coupler 61. The teeth shape of the first coupler 61 may be disposed radially on the basis of a watering motor shaft 43.

The second coupler 62 may have a lower side thereof opened, and the first coupler 61 may be inserted therein. The first and second couplers 61 and 62 may have shapes corresponding to each other, and may match with each other in shape when coupled with each other.

The second coupler 62 may include a coupling groove 62a having a conical shape into which the first coupler 61 is inserted. A teeth shape may be formed at the inner circumferential surface of the coupling groove 62a. The tooth shapes of the first coupler 61 and the second coupler 62 may engage with each other to deliver a torque.

Since the first and second couplers 61 and 62 are coupled in a form of cone, coupling and separation may be easy. Since the first and second couplers 61 and 62 are coupled in a form of cone, the power transmission shaft 64 and the watering motor shaft 43 may be accurately aligned when coupled to each other.

Even though the first and second couplers 61 and 62 are not accurately engaged with each other when the water tank 30 is placed, the engagement may be aligned while the second coupler 62 is being moved by a load when the first coupler 61 rotates.

The watering housing 80 may be spaced from the undersurface of the water tank 30 by a certain gap to form a suction gap. The watering housing 80 may draw water of the water tank 30 through the suction gap.

The watering housing 80 may have a lower side thereof opened. The watering housing 80 may have a cup shape. The watering housing 80 may have an inverted cup shape.

The column 35 of the water tank 30 may be located inside the watering housing 80. The watering housing 80 may be installed to cover the column 35.

The watering housing 80 may be formed such that the horizontal section thereof gradually expands in an upward direction. The column 35 may be formed such that the horizontal section thereof is gradually reduced in an upward direction. The shapes of the watering housing 80 and the column 35 may be implemented in order to efficiently pump water.

When the watering housing 80 rotates, drawn water may adhere closely to the inner circumferential surface of the watering housing 80 by a centrifugal force. The watering groove 81 formed on the inner circumferential surface of the watering housing 80 may provide a torque to water drawn to the inside.

A nozzle 41 may be disposed in the watering housing 80 to discharge drawn water to the outside. In this embodiment, the nozzle 41 may be formed in a horizontal direction. Pumped water may be discharged through the nozzle 41.

The number of nozzles 41 may vary with the design conditions. In this embodiment, the nozzle 41 may be disposed in plurality while having different heights from each other in the watering housing 80. A nozzle that is disposed at an upper side of the watering housing 80 may be defined as a high-speed nozzle, and a nozzle that is disposed at a middle side of the watering housing 80 may be defined as a normal nozzle.

Only when the watering housing 80 rotates at a high speed, water may be discharged out of the high-speed nozzle. When the watering housing 80 rotates at a normal speed, water may not be discharged through the high-speed nozzle. The normal nozzle may discharge water in all stages where a watering housing ordinarily operates.

When the watering housing 80 rotates at a usual rotation speed, pumped water may rise at least higher than the normal nozzle. When the watering housing 80 rotates at a high speed, pumped water may rise to a height equal to or higher than the high-speed nozzle.

The high-speed nozzle may be disposed in plurality in a circumferential direction of the watering housing 80. The normal nozzle may be also disposed in plurality in a circumferential direction of the watering housing 80.

When the watering housing 80 does not rotate, water may not be discharged through the nozzle 41. When a user operates only the clean mode, the watering unit 40 may not operate, and only the blower unit 20 may operate. Only when a user operates only the humidification mode or operates the clean mode and the humidification mode, the watering housing 80 may rotate, and water may be discharged out of the nozzle 41.

In this embodiment, water discharged out of the nozzle 41 may be sprayed to the inner side surface of the visual body 210. Since the watering housing 80 rotates, water discharged from the nozzle 41 may rotate while hitting the inner side surface of the visual body 210.

A user may visually check through the visual body 210 that water is sprayed. This spraying of water may mean that humidification mode is operating. Through the spraying of water, a user can intuitively check that humidification mode is operating.

Water passing through the water filter 70 may wet the humidification medium 50, and then may flow downward. Water flowing down from the humidification medium 50 may be guided into the water tank 30 along the dropping water preventing flow passage. Thereafter, water of the water tank 30 may be pumped into the watering housing 80, and may be sprayed. The above-mentioned processes may be repeated.

In this embodiment, the watering housing 80 may have three parts. Unlike this embodiment, the watering housing 80 may be manufactured into one or two components.

The watering housing 80 may include a first watering housing 82, a second watering housing 84, a watering housing cover 86, and a power transmission unit 88. The first watering housing 82 may be spaced from the water tank 30 by a certain gap, may have upper and lower sides thereof opened, and may include a watering groove 81 formed the inner side surface thereof. The second watering housing 84 may have upper and lower sides thereof opened, and may be coupled to the upper end of the first watering housing 82. The watering housing cover 86 may be coupled to the upper end of the second watering housing 84, and may cover the upper surface of the second watering housing 84. The power transmission unit 88 may be disposed inside the second watering housing 84, and may be coupled to the power transmission module 60 to deliver a torque to the second watering housing 84.

The watering groove 81 may be disposed inside the first watering housing 82. The watering groove 81 may be formed in upward and downward directions. The watering groove 81 may be radially disposed around the watering motor shaft 43. The watering groove 81 may be disposed in plurality, and may protrude toward the axial center of the watering housing 80.

The lower end of the first watering housing 82 may be spaced from the bottom of the water tank 30 to form the suction gap. The upper end of the first watering housing 82 may be coupled to the lower end of the second watering housing 84.

The first watering housing 82 may be circular in horizontal section, and the sectional area may gradually increase from the lower side to the upper side.

The first watering housing 82 and the second watering housing 84 may be assemblable and disassemblable. In this embodiment, the first watering housing 82 and the second watering housing 84 may be assembled through screw coupling. The first watering housing 82 may have a screw thread formed on the outer circumferential surface of the upper side thereof, and the second watering housing 84 may have a screw thread formed on the inner circumferential surface of the lower side thereof.

A watering blade 85 may be formed on the outer circumferential surface of the second watering housing 84. The watering blade 85 may allow humidified air to flow. Additionally, the watering blade 85 may be formed in a direction for pressing the watering housing 80 downwardly. When the watering housing 80 rotates, the watering housing 80 may receive a pressure upwardly by the pumped water. The watering blade 85 may be formed to press the watering housing 80 downwardly.

The watering housing cover 86 may be coupled to the upper side of the second watering housing 84 and seal the upper side of the second watering housing 84. The watering housing cover 86 may be screw-coupled to the second watering housing 84.

In this embodiment, the watering housing cover 86 may be assembled with the power transmission module 60. Unlike this embodiment, it may be regardless that the watering housing cover 86 is separated from the power transmission module 60.

A shaft fixing part 86a to which the power transmission shaft 64 of the power transmission module 60 described later is coupled may be formed on the undersurface of the watering housing cover 86. The shaft fixing part 86a may have a screw thread formed thereon. The upper end of the power transmission shaft 64 may have an outer circumferential surface thereof on which a screw thread is formed, and may be screw-coupled to the shaft fixing part 86a.

In this embodiment, the nozzle 41 may be formed in the first watering housing 82 and the second watering housing 84. A normal nozzle 44 may be formed in the first watering housing 82, and a high-speed nozzle 45 may be formed in the second watering housing 84.

In this embodiment, the power transmission unit 88 may be disposed inside the second watering housing 84. The power transmission unit 88 disposed in the second watering housing 84 may minimize an interference with the watering groove 81 during the injection. Unlike this embodiment, the power transmission unit 88 may be disposed inside the first watering housing 82.

In this embodiment, the power transmission unit 88 may be manufactured integrally with the second watering housing 84. Unlike this embodiment, the power transmission unit 88 may be assembled with the second watering housing 84.

The power transmission unit 88 may include a bushing installation part 89 located at the axial center of the watering housing 80, and a watering connection part 87 connecting the bushing installation part 89 and the watering housing 80. In this embodiment, the bushing installation part 89 and the watering connection part 87 may be manufactured into one body by injection molding.

The watering connection part 87 may be manufactured into a rib shape. The watering connection part 87 may be radially disposed around the axial center, and may be disposed in plurality. When the watering housing 80 rotates, the watering connection part 87 may increase a resistance with drawn water, and thus may improve the pumping efficiency.

A bushing 90 may be installed inside the bushing installation part 89. The bushing 90 may be coupled to the power transmission module 60 described later to receive a torque.

The bushing 90 may be coupled to the power transmission shaft 64 described later to receive a torque. Accordingly, the bushing 90 may be formed of a metallic material. The bushing 90 may be double-injected to the second watering housing 84. The bushing 90 may have a bushing shaft hollow 91 penetrated in a vertical direction.

When the watering housing 80 rotates, the bushing 90 may reduce vibration. The bushing 90 may be located on the power transmission shaft 64. In this embodiment, the bushing 90 may be located at the center of gravity of the watering housing 80. Since the center of gravity of the watering housing 80 is located on the bushing 90, the bushing 90 can significantly reduce the vibration of the watering housing 80 during the rotation.

The power transmission module 60 may be for delivering a torque of the watering motor 42 to the watering housing 80. In this embodiment, the power transmission module 60 may be installed inside the column 35, and the contact of the power transmission module 60 with water stored in the water tank 30 may be minimized.

The power transmission module 60 may include a power transmission housing 63, a power transmission shaft 64, a bearing 67, a first coupler 61, and a second coupler 62. The power transmission housing may be located inside the column 35. The power transmission shaft 64 may be located inside the power transmission housing 63, may penetrate the power transmission housing to upwardly protrude, and may provide a torque to the watering housing 80. The bearing 67 may be located between the power transmission shaft 64 and the power transmission housing 63. The first coupler 61 may be coupled to the watering motor shaft 43, and may rotate. The second coupler 62 may be coupled to the lower end of the power transmission shaft 64, and may be separably coupled to the first coupler 61 to be provided with a torque.

In this embodiment, in order to prevent the power transmission module 60 from contacting water, the power transmission module 60 may be installed inside the column 35.

In this embodiment, the power transmission housing 63, the power transmission shaft 64, the bearing 67, and the second coupler 62 may be disposed inside the column 35.

The power transmission shaft 64 may be installed to vertically penetrate the power transmission housing 63. The power transmission shaft 64 may rotate while penetrating the power transmission housing 63.

The power transmission housing 63 may be formed of a metallic material. The power transmission housing 63 may be formed of a highly corrosion-resistant aluminum or brass material.

The power transmission housing 63 may be installed on the upper side surface of the water tank base 34. The water tank base 34 may have an insertion hole 39 into which the first coupler 61 can be inserted. The power transmission housing 63 may seal the insertion hole 39.

The power transmission shaft 64 may penetrate the power transmission housing 63 in a vertical direction. The upper end of the power transmission shaft 64 may be coupled to the watering housing 80, and the lower end thereof may be coupled to the second coupler 62.

In this embodiment, the second coupler 62 may be disposed inside the power transmission housing 63.

The bearing 67 may be disposed between the power transmission housing 63 and the power transmission shaft 64. In this embodiment, the power transmission shaft 64 may be disposed to penetrate the bearing 67.

The upper side of the power transmission housing 63 may be exposed to the inside of the watering housing 80, and may be exposed to pumped water.

In order to prevent water from flowing into the power transmission housing 63, the upper side of the power transmission housing 63 may be sealed.

The power transmission housing 63 may include a bearing housing 65 having upper and lower sides thereof opened, a housing cap 66 coupled to the upper side of the bearing housing 65 and allowing the power transmission shaft 64 to penetrates the housing cap 66 in a vertical direction, an shaft gasket 68 disposed between the housing cap 66 and the power transmission shaft 64 and inserted into and fixed to the housing cap 66, and a housing elastic member 69 installed between the bearing 67 and the housing cap 66 to provide an elastic force.

A step 64a for supporting the bearing 67 may be formed at the power transmission shaft 64. The bearing 67 may be supported by the step 64a. The lower diameter of the step 64a may be formed greater than the upper diameter thereof.

The housing cap 66 may be coupled to the upper end of the bearing housing 65. The housing cap 66 may be fixedly fitted into the bearing housing 65. The housing cap 66 may be formed in a ring shape. A hollow may be formed inside the housing cap 66, and the power transmission shaft 64 may penetrate the hollow in a vertical direction.

The housing cap 66 may include a cap support part 66a inwardly protruding and supporting the shaft gasket 68. The shaft gasket 68 may be supported by the cap support part 66a.

The shaft gasket 68 may be formed of an elastic material. The shaft gasket 68 may prevent water from flowing into the bearing housing 65.

The shaft gasket 68 may include a gasket body 68a closely contacting the cap support part 66a and a gasket diaphragm 68b protruding from the gasket body 68a toward the power transmission shaft 64.

The gasket body 68a may have an "L"-shaped section, and the outer side surface and the lower side surface thereof may be supported by the housing cap 66.

The gasket diaphragm 68b may be formed integrally with the gasket body 68a.

The gasket diaphragm 68b may adhere closely to the outer side surface of the power transmission shaft 64. The gasket diaphragm 68b may be formed in two, and may doubly prevent inflow of water.

The housing elastic member 69 may be disposed between the housing cap 66 and the bearing 67. The upper end of the housing elastic member 69 may elastically support the housing cap 66, and the lower end of the housing elastic member 69 may be elastically supported by the bearing 67.

The housing elastic member 69 may downwardly pressurize the bearing 67 using an elastic force. The bearing 67 may be supported by the step 64a through the housing elastic member 69.

The housing elastic member 69 may minimize the vibration of the bearing 67 when the power transmission shaft 64 rotates.

Although the power transmission housing 63 is installed inside the column 35 in this embodiment, unlike this embodiment, the power transmission housing 63 may be exposed to the inside of the water tank 30.

In this embodiment, the power transmission shaft 64 may longitudinally extend in a vertical direction. Since the power transmission shaft 64 is installed extending long in a vertical direction, the capacity of the water tank 30 may be easily increased to a desired capacity.

If the capacity of the water tank 30 is small, the second coupler 62 may be directly installed to the watering housing 80. In this case, the components such as the power transmission shaft 64 and the bearing 67 may be omitted, and thus the structure may become simpler.

If the capacity of the water tank 30 is large, the watering housing 80 having a long length may be required. If the length of the watering housing 80 becomes longer, vibration occurs during rotation. That is, when a torque is delivered to only the lower side of the watering housing 80, a deformation such as distortion of the watering housing 80 may be occur, and there may be a speed difference at the upper side and the lower side of the watering housing 80.

Due to such a deformation or a speed difference, a large amount of vibration may occur in the watering housing 80.

In this embodiment, since the power transmission shaft 64 is coupled to each of the center of gravity and the upper end of the watering housing 80 while longitudinally extending in a vertical direction, the above-mentioned limitation can be overcome.

That is, in a structure as in this embodiment, even though the height of the watering housing 80 increases as the height of the water tank 30 increases, occurrence of vibration can be minimized.

Hereinafter, the flow passages of the humidification and air cleaning apparatus according to embodiments the present invention will be described in more detail.

The intake flow passage 101 may guide external air to the filter assembly 10. The intake flow passage 101 may be formed between the base 112 and the filter housing 140. More specifically, the intake flow passage 101 may range from the base 112 to the undersurface of the filter housing 140.

When external air moves to the undersurface of the filter housing 140, the flow direction of external air may change by about 90 degrees. However, the intake flow passage 101 receives external air in all directions of 360 degrees, a resistance according to the direction change may be small.

The filtering flow passage 102 may be for filtering external air. The filtering flow passage 102 may be formed inside the filter housing 140. The filter assembly 10 installed inside the filter housing 104 may filter external air. Accordingly, the filtering flow passage 102 may be formed in the filter housing 140 and the filter assembly 10.

In the filtering flow passage 102, the flow direction of air may be formed into a straight-line. In this embodiment, the filtering flow passage 102 may be formed in a vertical direction. In the filtering flow passage 102, air may flow from the lower side to the upper side.

The connection flow passage 103 may connect the clean module 100 and the humidification module 200 which are separable from each other, and may guide filtered air to the humidification module 200. The clean connection flow passage 104 of the connection flow passage 103 may be formed in the clean module 100, and the humidification connection flow passage 105 may be formed in the humidification module 200.

In this embodiment, the clean connection flow passage 104 may be formed in the support body 120. More specifically, the clean connection flow passage 104 may be formed between the inner support body 122 and the support guide 124.

The humidification connection flow passage 105 may be formed in the humidification module 200, and in this embodiment, may be formed outside the water tank 30. In this embodiment, the humidification connection flow passage 105 may not be formed in an independent flow passage, and may function as the humidification connection flow passage 105 when the support body 120 is placed.

That is, when the humidification module 200 is inserted into the inner support body 122, a space between the outside of the water tank 30 and the support guide 124 may function as the connection flow passage 103.

The connection flow passage 103 may guide air discharged out of the blower fan 24 to the humidification flow passage 106. The connection flow passage 103 may be formed into a straight-line. The connection flow passage 103 may guide filtered air from the lower side to the upper side.

Since filtered air is discharged from an edge of the blower fan 24, filtered air may straightly move without a direction change.

Filtered air may upwardly flow in a vertical direction along the connection flow passage 103 formed between the support guide 124 and the water tank 30.

The humidification flow passage 106 may provide moisture to filtered air. In this embodiment, since two humidification media 50 and 55 are disposed, the humidification flow passage 106 may be formed between the first humidification medium 50 and the second humidification medium 55.

Since water is naturally evaporated from the first humidification medium 50 and the second humidification medium 55, it may be difficult to accurately specify a flow passage through which moisture is supplied. However, it will be clear that humidification is performed by moisture provided from the first humidification medium 50 and the second humidification medium 55 and moisture provided from the watering unit 40.

In this embodiment, humidification for filtered air may be performed between the first humidification medium 50 and the second humidification medium 55. Unlike this embodiment, when only one of the first humidification medium 50 or the second humidification medium 55 is installed, the humidification flow passage may function after the humidification medium that is installed.

For example, when only the first humidification medium 50 is installed, humidification may be performed by the first humidification medium 50 and the watering unit 40. In this case, a space after the first humidification medium 50 that filtered air passes may be defined as the humidification flow passage. Particularly, since filtered air necessarily passes the inside of the water tank 30 and the first humidification medium 50, the humidification flow passage may include the inside of the water tank 30 and the first humidification medium 50.

On the other hand, when only the second humidification medium 55 is installed and the watering unit 40 wets the second humidification medium 55, a path from the internal space of the water tank 30, which filtered air passes, to the second humidification medium 55 may be defined as the humidification flow passage.

In this embodiment, the flow passage may be formed such that filtered air passes through both first humidification medium 50 and second humidification medium 55. Unlike this embodiment, filtered air may also be supplied with moisture while flowing along the surface of the first humidification medium 50. The second humidification medium 55 may also be disposed similarly.

Thus, the supply of moisture by the humidification media 50 and 55 may be variously modified. In this embodiment, although the humidification media 50 and 55 are formed into a flat surface and filtered air passes through the humidification media 50 and 55 formed into the flat surface, unlike this embodiment, the humidification media 50 and 55 may also be formed to have a curved shape or specific pattern to be more effectively supplied with moisture. For example, a flow passage may be formed inside the humidification media 50 and 55. Also, when an atmospheric pressure difference between the inside and the outside of the humidification media 50 and 55 and filtered air passes therethrough, water of the humidification media 50 and 55 can be more effectively vaporized or atomized.

When filtered air enters the humidification flow passage 106 from the connection flow passage 103, the flow direction of filtered air may slightly change. However, even in the process where filtered air enters from the connection flow passage 103 to the humidification flow passage 106, the main flow direction of air may direct to the upper side.

The first humidification medium 50 may be formed in a vertical direction, but filtered air may mainly flow in an oblique direction toward the upper side when passing the first humidification medium 50.

When filtered air enters the humidification flow passage 106 from the connection flow passage 103, the direction change of air may be equal to or less than about 90 degrees. In this embodiment, since the flow direction of air changes at an oblique angle of about 45 degrees with respect to the vertical direction when entering the humidification flow passage 106, an air resistance can be minimized.

Air in the water tank 30 may upwardly move in a vertical direction, and then may enter the discharge flow passage 107.

The discharge flow passage 107 may be formed in the humidification module 200. The discharge flow passage 107 may be defined as a space after the second humidification medium 55 through which humidified air passes.

The discharge flow passage 107 may be formed in all directions of 360 degrees with respect to the top cover assembly 230. Humidified air may be discharged to the upper side of the humidification module 200 along the discharge flow passage, and may be outwardly and obliquely discharged in a radial direction.

When humidified air enters the discharge flow passage 107 from the humidification flow passage 106, the flow direction of humidified air may slightly change. However, even when humidified air enters the discharge flow passage 107 from the humidification flow passage 106, the main flow direction of air may direct to the upper side, and the direction change of air may be equal to or smaller than about 45 degrees.

Thus, in the humidification and air cleaning apparatus, the main flow direction of air may direct to the upper side until entered air is discharged. The humidification and air cleaning apparatus according to the embodiment of the present invention may not have a section where air flowing therein directs to the lower side.

In the humidification and air cleaning apparatus according to this embodiment, the direction change of air may be equal to or smaller than about 90 degrees, and may be within an acute angle.

The humidification and air cleaning apparatuses according to the embodiments of the present invention have the following advantages.

First, since the visual body coupled with the water tank is separably installed over the base body, only the humidification module and the water tank contacting water can be separated and cleaned.

Second, since the watering unit pumps water inside the water tank and sprays water to the visual body, a user can intuitively check whether or not humidification is being performed, by seeing water colliding with the visual body.

Third, since the display module is disposed outside the visual body that does not contact water, influences by electric leakage and humidity can be minimized.

Fourth, since the display module is disposed in the visual space sealed from the outside, influences by water can be inhibited.

Fifth, since the display module is disposed on the outer side surface of the visual body and is covered by the visual body when viewed from top, water can be prevented from dropping down to the display module during the water supply.

Sixth, the water tank is inserted into the inside of the display module having a ring shape, and the display module can cover the outer surface of the water tank.

Seventh, since water drops formed on the inner side surface of the visual body are reflected from the surface of the display, a user can check water drops flowing down during the humidification.

Eighth, when a user sees the display module, water formed on the inner side surface of the visual body and the display module can be observed on a user's eye line.

Ninth, since the nozzle of the watering housing is disposed at the same height as the visual body, water sprayed from the nozzle can be observed through the visual body, and water colliding with the visual body can also be observed.

Tenth, since the display module is disposed over the water tank inlet and covers the water tank, the water tank inlet can be prevented from being exposed to the outside.

Eleventh, since the display module is disposed over the support guide and covers the support guide, the support guide can be prevented from being exposed to the outside.

Twelfth, since the outer side surface of the visual body is adhered closely to the inner edge of the display module when the water tank is placed in the base body, vibration occurring in the water tank can be inhibited.

It will be understood by those skilled in the art that the present invention can be implemented into other specific forms without changing the technical spirit or the essential features of the present invention. Therefore, the embodiments described above should be construed as illustrated and unlimited in all aspects. The scope of the present invention is represented by the scope of the claims described later rather than the detailed description. The meaning of the scope of the claims, the scope of the claims, and all changes and modifications derived from the equivalent concept thereof should be interpreted as being included in the scope of the present invention.

What is claimed is:

1. A humidification and air cleaning apparatus comprising:
   a water tank to store water, comprising a bottom wall and side wall extending upward from the bottom wall;
   a visual body disposed over the water tank, and formed of a transparent material;
   a display module disposed outside the visual body to display an operation state; and
   a watering housing rotatably disposed in the water tank, the watering housing comprising:
   a nozzle configured to spray water stored in the water tank,
   a bottom surface that is opened such that a lower end of the watering housing is spaced apart from the bottom wall of the water tank to form a suction gap, and
   an upper end that is disposed within a height of the visual body,
   wherein water drops formed on an inner side surface of the visual body are positioned above the display module.

2. The humidification and air cleaning apparatus of claim 1, wherein the nozzle is disposed within a height of the visual body and water sprayed from the nozzle collides with an inner side surface of the visual body.

3. The humidification and air cleaning apparatus of claim 1, wherein the visual body has an upper side thereof wider than a lower side thereof while having a side surface thereof oblique, and is disposed over the display module.

4. The humidification and air cleaning apparatus of claim 1, wherein the display module has a surface thereof coated with a material reflecting light, and water drops formed on the inner side surface of the visual body are projected on the surface of the display module.

5. The humidification and air cleaning apparatus of claim 1, wherein the visual body has a horizontal section thereof circular, and the display module has a ring shape.

6. The humidification and air cleaning apparatus of claim 1, further comprising a base body on which the water tank is separably placed,
   wherein the display module is coupled to the base body, and the water tank is separated from the display module when the water tank is separated from the base body.

7. The humidification and air cleaning apparatus of claim 6, wherein the display module is formed into a ring shape, and the water tank is inserted through the inside of the display module to be placed on the base body.

8. The humidification and air cleaning apparatus of claim 6, wherein when the water tank is placed, the display module is disposed to seal an outer surface of the water tank.

9. The humidification and air cleaning apparatus of claim 6, further comprising an outer visual body coupled to the base body and formed of a transparent material,
   wherein the display module is disposed between the outer visual body and the visual body.

10. The humidification and air cleaning apparatus of claim 9, wherein when the water tank is placed on the base body, an upper end of the visual body adheres closely to an upper end of the outer visual body, and a sealed visual space is formed among the visual body, the outer visual body, and the display module.

11. The humidification and air cleaning apparatus of claim 6, further comprising a water tank inlet disposed between the water tank and the visual body,
   wherein air supplied from the base body flows into the water tank through the water tank inlet, and the display module is disposed higher than the water tank inlet.

12. The humidification and air cleaning apparatus claim 6, wherein the base body comprises:
   a lower body comprising an intake flow passage formed at a lower side thereof;
   a support body coupled to an upper side of the lower body and placed on the water tank; and
   a water tank insertion space formed in the support body to accommodate the water tank,
   wherein the display module is disposed on the upper end of the support body.

13. The humidification and air cleaning apparatus of claim 12, further comprising a water tank inlet disposed between the water tank and the visual body,
   wherein air supplied from the base body flows into the water tank through the water tank inlet, and the display module is disposed higher than the water tank inlet, and
   the support body comprises a support guide to guide air supplied through the intake flow passage to the water tank inlet.

* * * * *